(12) United States Patent
Seong

(10) Patent No.: US 12,447,848 B2
(45) Date of Patent: Oct. 21, 2025

(54) POSITION ALIGNMENT APPARATUS AND METHOD FOR WIRELESS CHARGING

(71) Applicants: HYUNDAI MOTOR COMPANY, Seoul (KR); KIA CORPORATION, Seoul (KR)

(72) Inventor: Jae Yong Seong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 617 days.

(21) Appl. No.: 17/802,288

(22) PCT Filed: Feb. 15, 2021

(86) PCT No.: PCT/KR2021/001893
§ 371 (c)(1),
(2) Date: Aug. 25, 2022

(87) PCT Pub. No.: WO2021/172800
PCT Pub. Date: Sep. 2, 2021

(65) Prior Publication Data
US 2023/0088727 A1    Mar. 23, 2023

(30) Foreign Application Priority Data

Feb. 27, 2020  (KR) .................. 10-2020-0024505
Mar. 24, 2020  (KR) .................. 10-2020-0035612
(Continued)

(51) Int. Cl.
*H02J 7/00*       (2006.01)
*B60L 53/126*    (2019.01)
(Continued)

(52) U.S. Cl.
CPC ............. *B60L 53/38* (2019.02); *B60L 53/126* (2019.02); *B60L 53/305* (2019.02); *B60L 53/36* (2019.02);
(Continued)

(58) Field of Classification Search
CPC ...... B60L 53/38; B60L 53/126; B60L 53/305; B60L 53/36; B60L 53/66; H02J 7/0013; H02J 50/80; H02J 50/90; H04B 5/79
(Continued)

(56) References Cited

U.S. PATENT DOCUMENTS

2015/0015419 A1   1/2015   Halker et al.
2015/0023204 A1   1/2015   Wik et al.
(Continued)

FOREIGN PATENT DOCUMENTS

JP   2014-155399 A   8/2014
KR   2018-0095445 A   8/2018
(Continued)

OTHER PUBLICATIONS

IEC TS 61980-2, Technical Specification, Electric vehicle wireless power transfer (WPT) systems—Part 2: Specific requirements for communication between electric road vehicle (EV) and infrastructure, Edition 1.0 Jun. 2019 (88 pages).
(Continued)

*Primary Examiner* — Zixuan Zhou
(74) *Attorney, Agent, or Firm* — MCDONNELL BOEHNEN HULBERT & BERGHOFF LLP

(57) ABSTRACT

A position alignment method comprises recognizing the state of the plurality of GAs through wireless communication with an SECC for controlling the plurality of GAs, receiving information about one or more valid GAs among the plurality of GAs from the SECC, selecting a target GA on the basis of the information about the one or more valid
(Continued)

GAs, and establishing a wireless communication link; making a request to the SECC for performing a position alignment approval and authentication process, performing position alignment with the target GA using an LF signal if the authentication is successful, transmitting a dataset to the SECC using the LF signal after the position alignment with the target GA, and pairing with the target GA based on the dataset.

17 Claims, 34 Drawing Sheets

(30) Foreign Application Priority Data

Mar. 25, 2020 (KR) .......................... 10-2020-0036031
Feb. 8, 2021 (KR) .......................... 10-2021-0017573

(51) Int. Cl.
*B60L 53/30* (2019.01)
*B60L 53/36* (2019.01)
*B60L 53/38* (2019.01)
*B60L 53/66* (2019.01)
*H02J 50/80* (2016.01)
*H02J 50/90* (2016.01)
*H04B 5/79* (2024.01)

(52) U.S. Cl.
CPC ............ *B60L 53/66* (2019.02); *H02J 7/0013* (2013.01); *H02J 50/80* (2016.02); *H02J 50/90* (2016.02); *H04B 5/79* (2024.01)

(58) Field of Classification Search
USPC ...................... 320/108, 109; 701/22; 307/104
See application file for complete search history.

(56) References Cited

U.S. PATENT DOCUMENTS

| | | | |
|---|---|---|---|
| 2015/0042168 A1* | 2/2015 | Widmer | H02J 50/80 307/104 |
| 2018/0241258 A1 | 8/2018 | Seong | |
| 2018/0312071 A1 | 11/2018 | Long et al. | |
| 2019/0039465 A1 | 2/2019 | Jang | |

FOREIGN PATENT DOCUMENTS

| | | |
|---|---|---|
| KR | 2019-0015986 A | 2/2019 |
| WO | 2016/014294 A1 | 1/2016 |

OTHER PUBLICATIONS

International Search Report and Written Opinion for Int. App. No. PCT/KR2021/001893, mailed Jun. 2, 2021.

\* cited by examiner

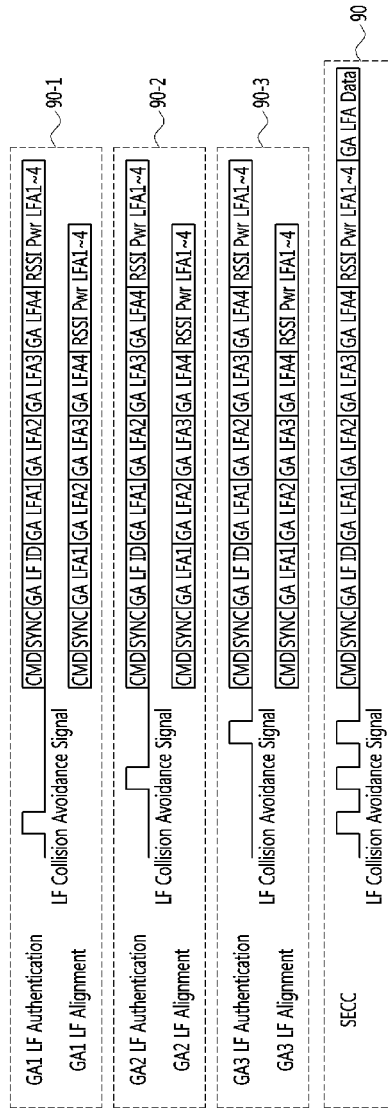
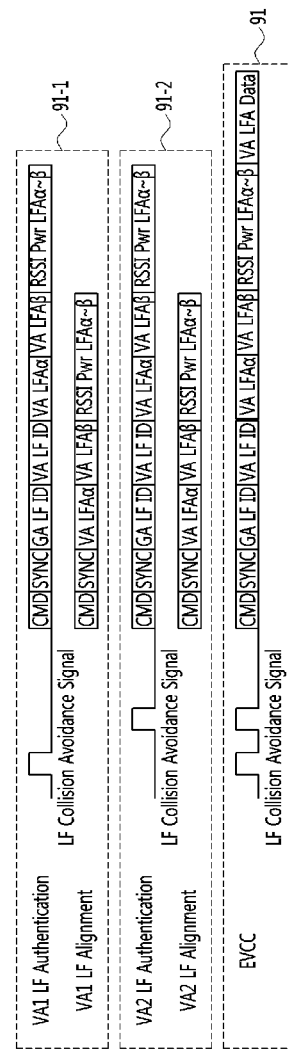
FIG. 9
FIG. 10

POSITION ALIGNMENT APPARATUS AND METHOD FOR WIRELESS CHARGING

CROSS REFERENCE TO RELATED APPLICATIONS

The present application is a U.S. National Phase Application pursuant to 35 U.S.C. § 371 of International Application No. PCT/KR2021/001893 filed Feb. 15, 2021, which claims priority to Korean Patent Application No. KR2020-0024505, filed on Feb. 27, 2020, Korean Patent Application No. KR2020-0035612, filed Mar. 24, 2020, Korean Patent Application KR2020-0036031, filed Mar. 25, 2020, and Korean Patent Application No. KR2021-0017573, filed Feb. 8, 2021. The entire disclosure contents of these applications are herewith incorporated by reference into the present application.

BACKGROUND

The present disclosure relates to a method and an apparatus for position alignment for wireless charging, and more particularly, to a method and an apparatus for performing position alignment for wireless charging using low frequency (LF) signals.

Recently developed electric vehicles (EV) drive a motor with power of a battery, have fewer sources of air pollution, such as exhaust gas and noise, compared to conventional gasoline engine vehicles, and have advantages of fewer breakdowns, longer life, and simple driving operations.

The EVs are classified into hybrid electric vehicles (HEVs), plug-in hybrid electric vehicles (PHEVs), and electric vehicles (EVs) according to their driving sources. The HEV has an engine as a main power and a motor as an auxiliary power. The PHEV has a motor that is a main power and an engine that is used when a battery is discharged. The EV has a motor, but no engine.

Wireless charging of a battery for driving the motor of EV may be performed by combining a primary coil of a charging station and a secondary coil of the EV in a magnetic resonance scheme. In addition, in a magnetic resonance wireless power transfer system, if the primary coil and the secondary coil are not aligned, the efficiency of wireless power transfer may be greatly reduced. Therefore, in order to increase the efficiency of wireless charging, the alignment between the primary coil and the secondary coil may be required.

As a conventional alignment scheme, there is a method of aligning an EV equipped with a secondary coil with a primary coil of a ground assembly (GA) by using a rear camera. In addition, as another conventional alignment scheme, after an EV is parked by a bump in a parking lot, there is a method of moving a movable charging pad to align a primary coil of the charging pad with a secondary coil of the EV.

However, the conventional techniques cause a user's intervention in the alignment of the coils, inconvenience of the alignment and the user, and a large deviation in the alignment, which may cause excessive system performance degradation due to even a slight coil misalignment. Therefore, using the above-described conventional techniques in the magnetic resonance type wireless power transfer system sensitive to a coil misalignment, it is difficult to realize optimal power transfer efficiency, and stability and reliability of the system may be lowered.

Accordingly, there is a need for a method of precisely aligning a primary coil of a GA of a charging station and a secondary coil of an EV in order to charge a high voltage battery mounted in the EV in a wireless power transfer system.

SUMMARY

An objective of the present disclosure for solving the above-described problem is to provide a position alignment method for wireless charging in which position alignment is performed using LF signals.

Another objective of the present disclosure for solving the above-described problem is to provide a position alignment apparatus for wireless charging in which position alignment is performed using LF signals.

Another objective of the present disclosure for solving the above-described problem is to provide a position alignment control method for wireless charging using LF signals.

A position alignment method according to an exemplary embodiment of the present disclosure for achieving the objective, as a position alignment method for wireless charging, performed by a VA to perform position alignment with a target GA among a plurality of GAs, may comprise recognizing states of the plurality of GAs through wireless communication with a supply equipment communication controller (SECC) controlling the plurality of GAs;, receiving information on one or more valid GAs among the plurality of GAs from the SECC, selecting a target GA based on the information on the one or more valid GAs, and performing wireless communication association with the target GA, performing a position alignment approval and authentication procedure by making a request to the SECC, performing position alignment with the target GA using LF signals when authentication is successful, transmitting a data set to the SECC using LF signals after the position alignment with the target GA, and performing pairing with the target GA based on the data set.

The data set may include a preamble block including preamble information for identifying an input signal and synchronization information, and a data block including first data fixed to zeros, an arbitrarily assigned pairing identifier (ID), dummy data, cyclic redundancy check (CRC) information, and guard information.

The performing of the paring may comprise requesting pairing to the SECC, transmitting the data set including a pairing ID to the SECC using LF signals, and receiving a response to the pairing request from the SECC.

The information on the one or more valid GAs may include at least one of a GA ID for each GA, unique information of an LF system, wireless signal strength information, or combinations thereof.

The unique information of the LF system may include at least one of information on an LF collision-avoidance signal assigned to each GA, LF ID, LF antenna information, magnetic field detection sensitivity for each antenna, or combinations thereof The selecting of the target GA based on the information on the one or more valid GAs may comprise comparing wireless signal strengths of the one or more valid GAs, and selecting a GA with a highest wireless signal strength as the target GA.

The state of the GA may indicate a normal state in which charging is possible, a state in which charging is being performed, or a state in which alignment is being performed.

The selecting of the target GA based on the information on the one or more valid GAs and performing of the wireless communication association with the target GA may comprise modifying LF information of the VA based on LF information of the selected target GA.

A position alignment apparatus according to another exemplary embodiment of the present disclosure for achieving the objective, as a position alignment apparatus for performing position alignment with a target GA among a plurality of GAs, may comprise at least one processor, and a memory storing at least one instruction executable by the at least one processor, wherein when executed by the at least one processor, the at least one instruction causes the position alignment apparatus to recognize states of the plurality of GAs through wireless communication with an SECC controlling the plurality of GAs, receive information on one or more valid GAs among the plurality of GAs from the SECC, select a target GA based on the information on the one or more valid GAs, and perform wireless communication association with the target GA, perform a position alignment approval and authentication procedure by making a request to the SECC, perform position alignment with the target GA using LF signals when authentication is successful, transmit a data set to the SECC using LF signals after the position alignment with the target GA, and perform pairing with the target GA based on the data set.

The data set may include a preamble block including preamble information for identifying an input signal and synchronization information, and a data block including first data fixed to zeros, an arbitrarily assigned pairing identifier (ID), dummy data, CRC information, and guard information.

In the performing of the paring, the at least one instruction may cause the position alignment apparatus to request pairing to the SECC, transmit the data set including a pairing ID to the SECC using LF signals, and receive a response to the pairing request from the SECC.

The information on the one or more valid GAs may include at least one of a GA ID for each GA, unique information of an LF system, wireless signal strength information, or combinations thereof.

The unique information of the LF system may include at least one of information on an LF collision-avoidance signal assigned to each GA, LF ID, LF antenna information, magnetic field detection sensitivity for each antenna, or combinations thereof In the selecting of the target GA based on the information on the one or more valid GAs, the at least one instruction may cause the position alignment apparatus to compare wireless signal strengths of the one or more valid GAs, and select a GA with a highest wireless signal strength as the target GA.

The state of the GA may indicate a normal state in which charging is possible, a state in which charging is being performed, or a state in which alignment is being performed.

In the selecting of the target GA based on the information on the one or more valid GAs and performing of the wireless communication association with the target GA, the at least one instruction may cause the position alignment apparatus to modify LF information of the VA based on LF information of the selected target GA.

A position alignment method according to yet another exemplary embodiment of the present disclosure for achieving the objective, as a position alignment method for wireless charging, performed by an SECC controlling a plurality of GAs, may comprise providing information on one or more valid GAs to an EV entering within a radio communication radius of the SECC, performing wireless communication association between the SECC of a target GA selected by the EV among the one or more valid GAs and an EVCC, performing a position alignment approval and authentication procedure between the EV and the target GA according to a request of the EVCC, performing position alignment between the EV and the target GA using LF signals when authentication is successful, receiving a data set from the EVCC using LF signals after the position alignment with the target GA, and performing pairing with the target GA based on the data set.

The data set may include a preamble block including preamble information for identifying an input signal and synchronization information, and a data block including first data fixed to zeros, an arbitrarily assigned pairing ID, dummy data, CRC information, and guard information.

The performing of the pairing may comprise receiving a pairing request from the EVCC, receiving the data set including a pairing ID from the EVCC using LF signals, performing comparison on the pairing ID, and transmitting a response for the pairing request to the EVCC.

The information on the one or more valid GAs may include at least one of a GA ID for each GA, unique information of an LF system, wireless signal strength information, or combinations thereof.

According to the present disclosure, when a plurality of vehicles are present within a wireless charging space, a problem in which a magnetic field value required for position alignment is disturbed due to an interference between magnetic fields emitted by of low-frequency antennas of different vehicles, and correct position alignment data cannot be acquired may be prevented.

In addition, according to the present disclosure, by preventing overlapping between LF collision-avoidance signals of GAs in a situation in which a plurality of GAs exist, the EV can correctly distinguish an infrastructure GA in an EV wireless charging system.

BRIEF DESCRIPTION OF THE FIGURES

FIG. 9 is a conceptual diagram illustrating a detailed configuration of an LF telegram of a GA according to an exemplary embodiment of the present disclosure.

FIG. 10 is a conceptual diagram illustrating a detailed configuration of an LF telegram of a VA according to an exemplary embodiment of the present disclosure.

DETAILED DESCRIPTION

Figure 1:
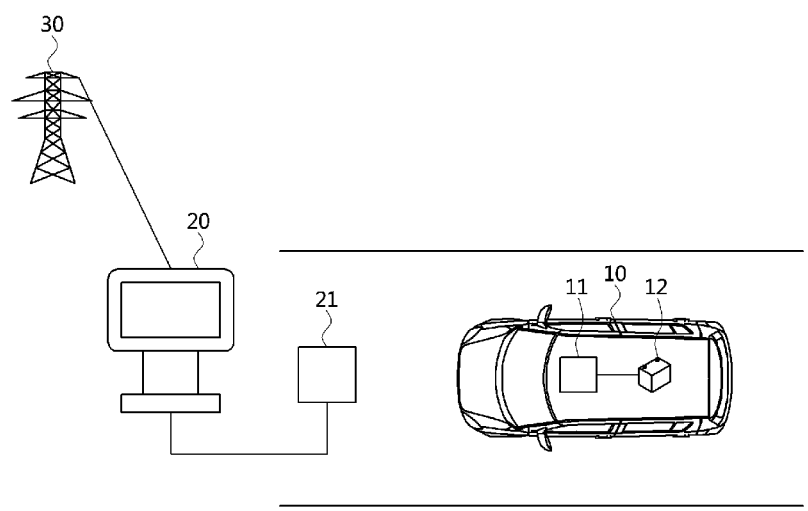
FIG. 1 is a conceptual diagram illustrating a concept of wireless power transfer ("WPT") to which exemplary embodiments of the present disclosure are applied.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Additional terms used in the present specification are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that may transfer power. The automatic charging may be performed after obtaining necessary authentication and right.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, a power supply side device, or the like, and the VA may be referred to as an EV device, an EV side device, or the like.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed within the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to adjust an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc.

Hereinafter, exemplary embodiments of the present disclosure will be explained in detail by referring to accompanying figures.

FIG. 1 is a conceptual diagram illustrating a concept of WPT to which exemplary embodiments of the present disclosure are applied.

As shown in FIG. 1, WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10. Here, the wireless communications may be Bluetooth, ZigBee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
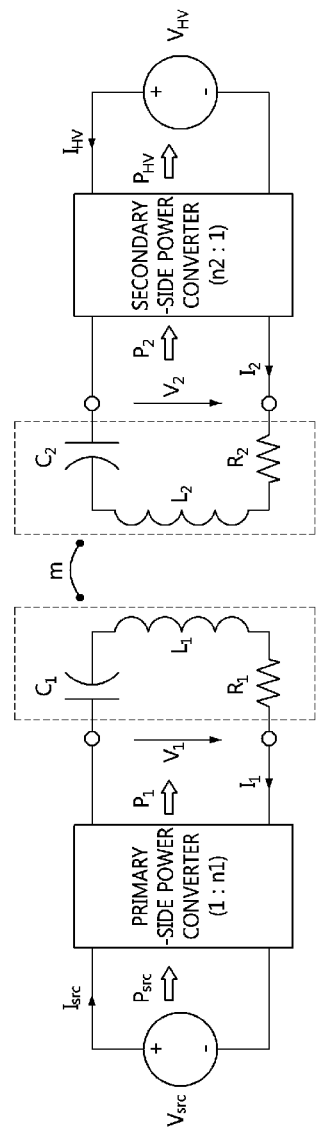
FIG. 2 is a conceptual diagram illustrating a WPT circuit according to an exemplary embodiment of the present disclosure.

FIG. 2 is a conceptual diagram illustrating a WPT circuit according to an exemplary embodiment of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Also, the transmission coil may be referred to also as a GA coil, and the reception coil may be referred to also as a VA coil. Therefore, positioning between the transmission pad and the reception pad or positioning between the EV and the transmission pad will be described below with reference to the drawings.

Figure 3:
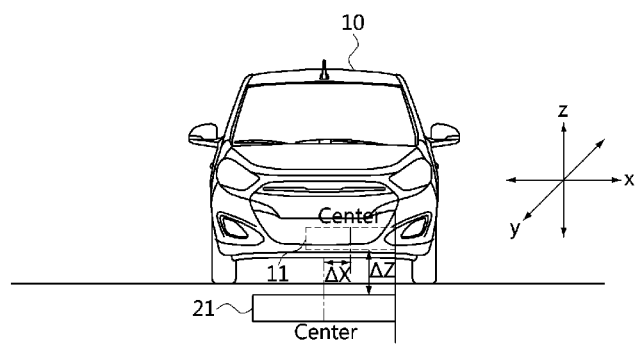
FIG. 3 is a conceptual diagram for explaining a concept of alignment in an EV WPT according to an exemplary embodiment of the present disclosure.

FIG. 3 is a conceptual diagram for explaining a concept of alignment in an EV WPT according to an exemplary embodiment of the present disclosure.

As shown in FIG. 3, a method of aligning the power transmission pad 21 and the power reception pad 11 in the EV in FIG. 1 will be described. Here, positional alignment may correspond to the alignment, which is the above-mentioned term, and thus may be defined as positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories based on its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported depending on the type of the reception pad 11, or the class 1 and 2 may be supported depending on the type of the reception pad 11.

The height of the reception pad measured from the ground surface may correspond to the previously defined term "vehicle magnetic ground clearance."

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

In embodiments, the relative positions of the power transmission pad 21 and the power reception pad 11 may be varied in accordance with their experimental results, and the numerical values should be understood as examples.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Meanwhile, to maximize a charging efficiency during wireless charging to an EV, LF signals may be used for alignment between the primary coil (i.e., GA coil) and the secondary coil (i.e., VA coil). Also, in the society of automotive engineers (SAE) standard meetings, considering autonomous driving technology, position alignment techniques using autonomous parking or remote parking is being studied.

Also, according to ISO 15118-8 that is an EV charging communication standard document, when wireless communication for charging an EV is used, communication between an electric vehicle communication controller (EVCC) and a supply equipment communication controller (SECC) conforms to the IEEE 802.11-2012. A required range of a distance between the EVCC and the SECC for a communication channel considered in the wireless communication is 5 m to 30 m for discovery, 10 cm to 5 m for fine positioning (fine alignment), and 5 cm to 5 m for charge control.

Here, the discovery is a step in which an EV searches for a charging pad, and the EVCC enters a communication region of at least one SECC and connects with an appropriate SECC. The fine positioning may refer to alignment between primary and secondary devices for efficient power transfer in case of WPT, and alignment between connectors of the EV and an EVSE for power transfer in case of an automatic connection for conductive charging. The charge control may be in form of, for example, a power request from the EV to the EVSE.

Figure 4:
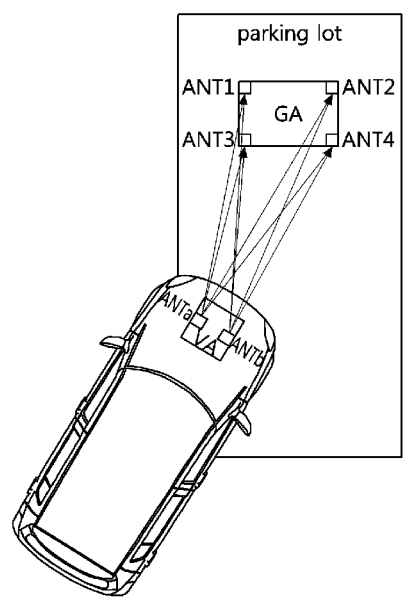
FIG. 4 is a conceptual diagram illustrating position alignment for wireless charging to which exemplary embodiments of the present disclosure are applied.

FIG. 4 is a conceptual diagram illustrating position alignment for wireless charging to which exemplary embodiments of the present disclosure are applied.

As shown in FIG. 4, a position alignment method according to an exemplary embodiment of the present disclosure, which is a method for maximizing and/or optimizing the wireless charging efficiency by aligning a primary coil of a GA to a secondary coil of a VA, may be performed based on measurement of magnetic fields between four antennas ANT1, ANT2, ANT3 and ANT4 in the GA side and two antennas ANTa and ANTb in the VA side.

In particular, the VA may include two antennas, and the two antennas may be disposed one by one (e.g., sequentially) in the left and right regions of the VA. The left and right regions may refer to regions divided into two halves of the VA, and may be left and right symmetrically separated regions. When the VA has a rectangular structure, the two antennas may be disposed at the center of the left side and the center of the right side respectively of the rectangular structure, but the structure is not limited to a rectangle because it may be changed according to a design selection.

Additionally, the two antennas may be disposed in a specific portion of the vehicle as connected with the VA, in which case they may be disposed one by one in the left and right regions of the specific portion of the vehicle. The left region and the right region of the specific portion of the vehicle may refer to symmetrically separated regions in the specific portion of the vehicle. Alternatively, instead of the left and right regions of the specific portion of the VA or the vehicle, a front region and a rear region of the specific portion of the VA or the vehicle may be used, but are not limited thereto. In other words, two regions that are symmetrically separated may be generally used. Hereinafter, it will be assumed that the antennas are disposed in the VA.

The VA or a VA controller may control the antennas and may include a position alignment apparatus for calculating position difference information between the VA and the GA.

The GA may include four antennas, and the four antennas may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size. When the GA has a rectangular structure, the four antennas may be disposed at each corner of the rectangular structure, but the structure is not limited to a rectangle because it may be changed according to a design selection. Additionally, the GA or a GA controller may also calculate magnetic field measurement values based on magnetic fields detected by the four antennas, and may include a magnetic field detection apparatus for transmitting the magnetic field measurement values to the position alignment apparatus.

Herein, the antenna included in the VA and/or GA may refer to a loop antenna or may refer to a ferrite rod antenna, but is not limited thereto.

The ferrite rod antenna may refer to an antenna using an LF. Here, the LF may refer to an LF band using a band of 30 to 300 kHz among 12 frequency ranges classified by International Telecommunication Union (ITU).

Figure 5:
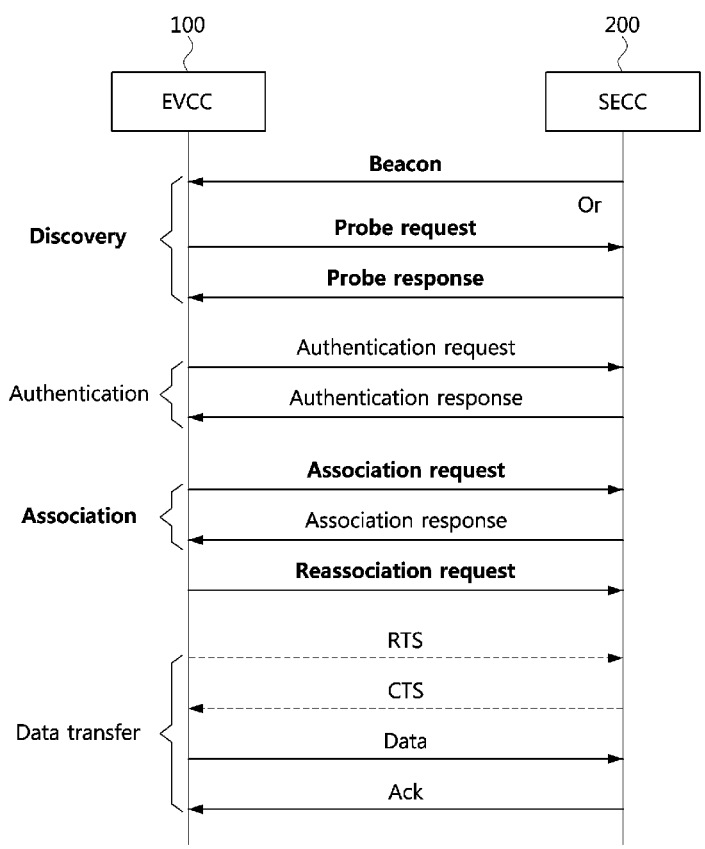
FIG. 5 is a diagram illustrating a wireless communication association procedure for EV charging.

FIG. 5 is a diagram illustrating a wireless communication association procedure for EV charging.

As shown in FIG. 5, a wireless communication association procedure performed between an EVCC 100 and an SECC 200 for EV charging may comprise a discovery step, an authentication step, an association step, and a data transfer step.

Among frames transmitted and received in these steps, frames redefined by ISO 15118-8 for wireless charging may include frames related to a beacon, probe request, and probe response in the discovery step, and an association request, association response, and reassociation request in the association step.

In the data transfer step, optional frames such as a request-to-send (RTS) frame and a clear-to-send (CTS) frame may be used.

Figure 6:
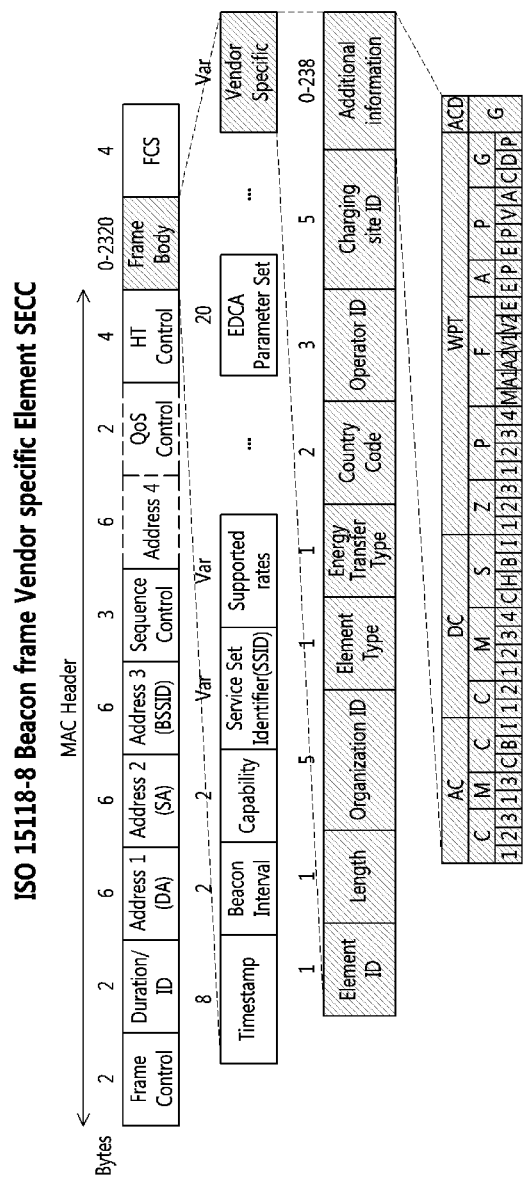
FIG. 6 is a conceptual diagram illustrating a MAC header structure of a communication frame used for position alignment for wireless charging that can be applied to exemplary embodiments of the present disclosure.

FIG. 6 is a conceptual diagram illustrating a MAC header structure of a communication frame used for position alignment for wireless charging that can be applied to exemplary embodiments of the present disclosure.

The ISO 15118-8, one of the standards related to wireless charging, complies with the standards of the IEEE Std 802.11-2012, but is redefining some of MAC management frames for wireless communication (i.e., vehicle-to-grid (V2G)) for EV charging.

As shown in FIG. 6, a structure of a MAC header of a beacon frame among the MAC management frames is shown for wireless communication (V2G) for EV charging, which is separately defined by the ISO 15118-8.

The redefined part in the corresponding frame is a vendor specific element of a frame body. This element describes various charger information and a power transfer scheme (AC, DC, WPT, or ACD).

In the ISO 15118-8, some of the MAC management frames are specified for each step of the wireless communication association. In addition to the beacon frame shown in FIG. 5, the ISO 15118-8 presents configurations of the probe request frame, probe response frame, association request frame, and reassociation request frame which are related to other steps of the wireless communication association procedure.

Figure 7:
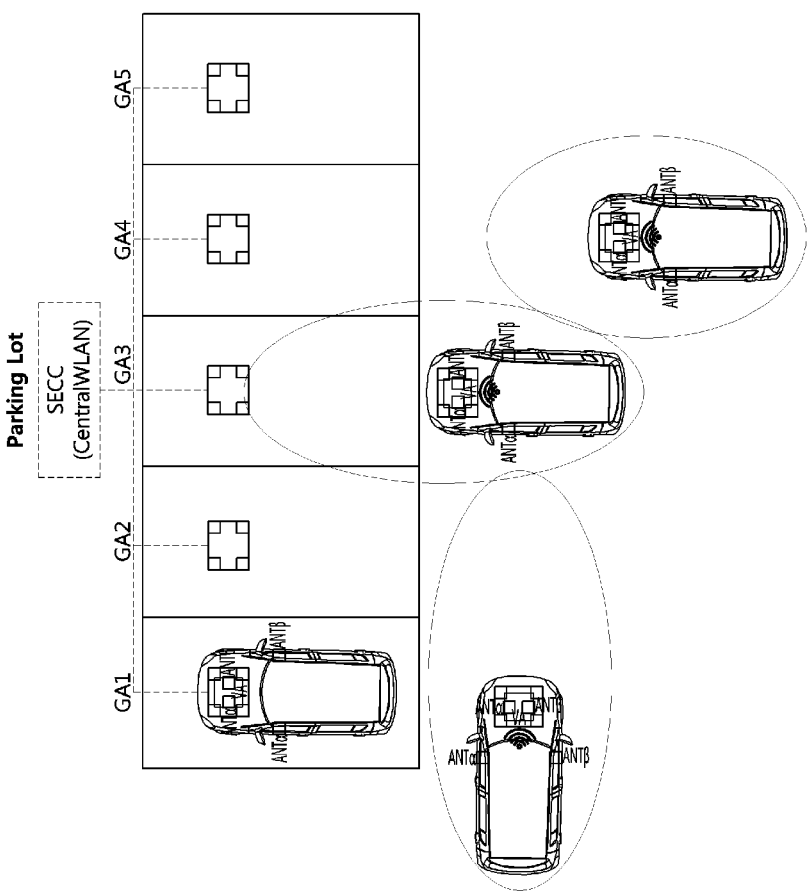
FIG. 7 is a conceptual diagram illustrating magnetic field interference caused by wireless charging to a plurality of vehicles.

FIG. 7 is a conceptual diagram illustrating magnetic field interference caused by wireless charging to a plurality of vehicles.

When a GA and a vehicle equipped with a VA want to align their positions using low-frequency antenna(s), a magnetic field formed by the VA may be maximized, and a magnetic field detected by the GA may be minimized. Here, as shown in FIG. 7, in a parking lot where the GAs of the EV wireless charging system are installed, for example, in a parking lot where at least three GAs are installed adjacently, a situation in which at least two vehicles each of which is equipped with a VA sequentially or simultaneously want to park is assumed. In this case, if a vehicle equipped with a VA attempts to align its position with the GA by using low-frequency antenna(s), a situation may arise in which correct alignment cannot be performed due to magnetic field interference.

Communication between the GA(s) and the VA may be classified into a single association scheme and a multiple association scheme, and when the wireless communication association scheme of the wireless charging system is the multiple association scheme, the above-described problem may occur. Here, the single association scheme means that communication is made in an individual space where only one GA and the VA exist. The multiple association scheme may occur when there are multiple GAs in a public place.

The present disclosure provides a solution capable of preventing such a problem.

More specifically, exemplary embodiments of the present disclosure are directed to solving the problem of not acquiring correct position alignment data because a magnetic field value required for position alignment is disturbed due to interference of magnetic fields emitted by different vehicles when performing position alignment in an EV wireless charging system using LF antennas.

Here, 'different low-frequency antennas' may be understood to refer to both low-frequency antennas having different IDs and using the same resonant frequency and low-frequency antennas using different resonant frequencies. The current standard describes a method of using low-frequency antennas as a position alignment scheme for an EV wireless charging system, but does not specify a resonance frequency of the low-frequency antennas for position alignment.

Figure 8:
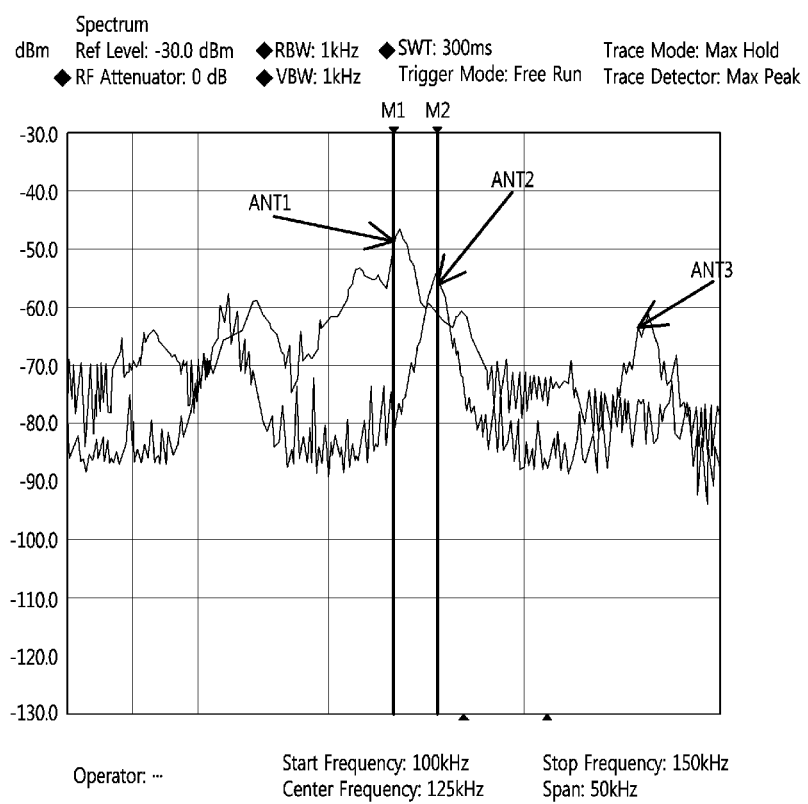
FIG. 8 is a graph illustrating a phenomenon in which a magnetic field value is disturbed due to interference between magnetic fields of low-frequency antennas emitted by different vehicles when performing position alignment of an EV wireless charging system.

FIG. 8 is a graph illustrating a phenomenon in which a magnetic field value is disturbed due to interference between magnetic fields of low-frequency antennas emitted by different vehicles when performing position alignment of an EV wireless charging system.

As shown in FIG. 8, a first LF antenna ANT1 and a second LF antenna ANT2 use the same resonant frequency of 125 kHz. As a natural result, signals of the first LF antenna and the second LF antenna overlap each other, making it difficult to distinguish them.

Meanwhile, a third LF antenna ANT3 uses a resonant frequency of 145 kHz, so that the first LF antenna ANT1 and the third LF antenna ANT3 have adjacent resonant frequencies. Although center frequencies of the two antennas are spaced apart by about 20 kHz, since the LF antennas for position alignment used in the EV wireless charging system should continuously transmit and receive signals until the position alignment between the GA and the VA is completed, a signal distortion due to magnetic field interference may occur.

Regardless of whether the wireless communication scheme is the single association scheme or multiple association scheme in the EV wireless charging system, the EV should be able to correctly identify the GA, which is an infrastructure. Accordingly, the present disclosure provides a method for accurately recognizing a wireless charging point through the following exemplary embodiments.

In an exemplary embodiment, when LF signals are determined to be used as the position alignment scheme, the GA may deliver, to the VA, information on its unique ID which is given during a procedure of installing the GA, and unique information on LF signals. The unique information on LF signals may include an LF collision-avoidance signal, an LF ID of a GA#No, LF antenna (LFA) information of the GA#No, and magnetic field detection sensitivity information.

The VA may synchronize its VA LF signal with an LF signal of the GA based on the information delivered from the GA. Firstly, if the unique ID information of the GA returned by the VA to the GA through wireless communication is incorrect ID information due to a wireless communication problem, the VA may not be able to accurately recognize the wireless charging point, and thus the wireless communication association procedure may be performed again.

In addition, in the present disclosure, the VA may secondarily compare the unique information on the LF signals through an LF telegram and perform authentication. After synchronizing its LF signal with the LF signal transmitted by the GA, the VA may return the synchronized VA's LF signal to the GA. The GA may compare the signal received from the VA with the LF collision-avoidance signal to check whether the received signal coincides with the signal transmitted by itself If the received signal is the same as the signal transmitted by the GA, it may be determined that the authentication is successful, and a next procedure (i.e., alignment step) may be performed. If the received signal and the signal transmitted by the GA itself do not match, the authentication is not successful, so the wireless communication association procedure may be performed again.

Here, the LF collision-avoidance signal is a signal uniquely assigned to each GA when the multiple association scheme is used, and the LF collision-avoidance signals given to the respective GAs are not identical to each other. The meaning of being unique to each GA may be understood as meaning that, for example, a time division multiplexing (TDM) scheme is used or applied to prevent overlap between the LF collision-avoidance signals for the respective GAs.

Also, when the SECC delivers information on the GAs to the EVCC, it does not deliver information on all GAs at once, but sequentially delivers information on the respective GAs.

In the present disclosure, by using the above two schemes in parallel, the electric vehicle can correctly distinguish the GA in the EV wireless charging system, which is the infrastructure.

Second, when the multiple association scheme is used in the EV wireless charging system, a plurality of EVs may access the GA for wireless charging at the same time. Also, due to this, magnetic field interference between LF signals may occur. In order to solve this problem, the SECC may control access to the GA by assigning sequence numbers to the EVCCs and giving priority to the EVCC accessing first. In this manner, it is possible to prevent in advance the collision problem that occurs when a plurality of EVs approach the GA at the same time and the distortion of the position alignment data due to the magnetic field interference of the LF signals.

A method for the EV to distinguish each GA is to use the LF telegram. The most important manner for a vehicle to identify each GA is in the LF telegram. In the present disclosure, it is also intended to prevent the magnetic field from being distorted by designating the order of the following vehicles entering in advance using the WLAN. This method may be used more suitably in the case of remote parking than when the driver parks directly.

FIG. 9 is a conceptual diagram illustrating a detailed configuration of an LF telegram of a GA according to an exemplary embodiment of the present disclosure.

FIG. 9 shows an LF telegram 90-1 of a GA1, an LF telegram 90-2 of a GA2, and an LF telegram 90-3 of a GA3. At the bottom of FIG. 9, an LF telegram 90 of all the GAs is shown from the perspective of the SECC.

The LF telegram may mean a series of signals including unique information of a GA or VA as well as information on an LF collision-avoidance signal.

As shown in FIG. 9, the LF signals for the respective GAs are controlled not to overlap in time.

The LF telegram for each GA may be classified into a telegram for LF authentication and a telegram for LF alignment. The telegram for LF authentication for each GA may include a command (CMD), sync (SYNC), GA LF ID, LF antenna information (e.g., GA LFA1, GA LFA2, GA LFA3, GA LFA4), and magnetic field detection sensitivity information (e.g., RSSI Pwr LFA1-4).

The telegram for LF alignment for each GA may include a command (CMD), sync (SYNC), LF antenna information (e.g., GA LFA1, GA LFA2, GA LFA3, GA LFA4) and magnetic field detection sensitivity information (e.g., RSSI Pwr LFA1-4). Here, the CMD serves as a header in wireless communication, and the SYNC is a field for adjusting a periodicity according to a clock signal for transmission of most significant bits (MSBs) in the LF telegram having a serial-peripheral interface (SPI) structure.

FIG. 10 is a conceptual diagram illustrating a detailed configuration of an LF telegram of a VA according to an exemplary embodiment of the present disclosure.

According to an exemplary embodiment of the present disclosure, the VA generates an LF magnetic field for position alignment. FIG. 10 shows an LF telegram 91-1 of a VA1 and an LF telegram 91-2 of a VA2. At the bottom of FIG. 10, a form of an LF telegram 91 including collision-avoidance signals of all VAs, which is generated and controlled by the EVCC, is shown.

As shown in FIG. 10, the LF signals for the respective VAs are controlled not to overlap in time.

The LF telegram for each VA may also be classified into a telegram for LF authentication and a telegram for LF alignment, similarly to that of the GA. The telegram for LF authentication for each VA may include a command (CMD), sync (SYNC), GA LF ID, VA LF ID, LF antenna information (e.g., VA LFAα, VA LFAβ) and magnetic field related information (e.g., RSSI LFAα, VA LFAβ). Since the VA should perform synchronization based on the information of the GA (i.e., the VA configures its own LF information to use the LF collision-avoidance signal used by the selected GA) and return the information to the GA, it can be seen that VA's LF telegram includes GA synchronization information (i.e., GA LF ID).

The telegram for LF alignment for each GA may include a command (CMD), sync (SYNC), LF antenna information (e.g., VA LFAα, LFAβ) and magnetic field related information (e.g., RSSI Pwr LFAα, β).

Figure 11:
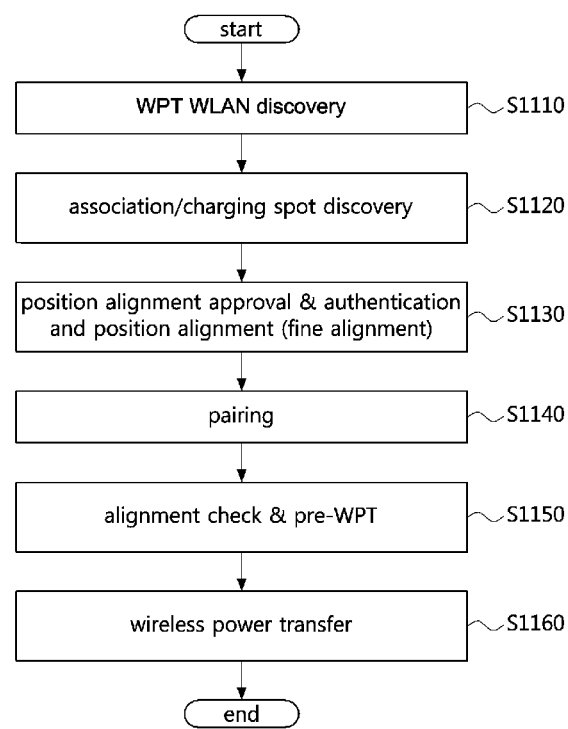
FIG. 11 is a conceptual diagram illustrating an overall operational flow of a wireless charging method including position alignment according to an exemplary embodiment of the present disclosure.

FIG. 11 is a conceptual diagram illustrating an overall operational flow of a wireless charging method including position alignment according to an exemplary embodiment of the present disclosure.

The wireless charging method shown in FIG. 11 may be performed by a VA (or EVCC) and a GA (SECC), and may comprise a WPT WLAN discovery step at S1110, wireless communication association/charging spot discovery step at S1120, position alignment approval & authentication, and fine alignment step at S1130, pairing step at S1140, alignment check and wireless charging preparation (i.e., pre-WPT) step at S1150, and wireless power transfer step at S1160.

The position alignment method seen from the VA side may comprise recognizing states of a plurality of GAs through wireless communication with an SECC controlling the plurality of GAs, receiving information on one or more valid GAs among the plurality of GAs from the SECC, selecting a target GA based on the information on the one or more valid GAs and performing wireless communication association with the target GA, performing a position alignment approval and authentication procedure by making a request to the SECC, performing position alignment with the target GA using LF signals when authentication is successful, transmitting a data set to the SECC using LF signals after the position alignment with the target GA, and performing pairing with the target GA based on the data set.

Here, the LF signal given to each GA may be distinguished from the LF signals given to other GAs by a time division multiplexing (TDM) scheme.

On the other hand, the position alignment method seen from the SECC side may comprise: providing information on one or more valid GAs to an EV entering within a radio communication radius of the SECC, performing wireless communication association between the SECC of a target GA selected by the EV among the one or more valid GAs and an EVCC, performing a position alignment approval and authentication procedure between the EV and the target GA according to a request of the EVCC, performing position alignment between the EV and the target GA using LF signals when authentication is successful, receiving a data set from the EVCC using LF signals after the position alignment with the target GA, and performing pairing with the target GA based on the data set.

Hereinafter, the position alignment method for wireless charging according to the present disclosure will be described in detail through exemplary embodiments.

In the exemplary embodiments, as shown in FIG. 7, a configuration in which multiple communications are configured between GAs and VAs and a situation in which at least two vehicles each of which is equipped with a VA sequentially or simultaneously want to park in a parking lot where the GAs of the EV wireless charging system are installed, for example, in a parking lot where at least three GAs are installed adjacently are assumed.

Figure 12:
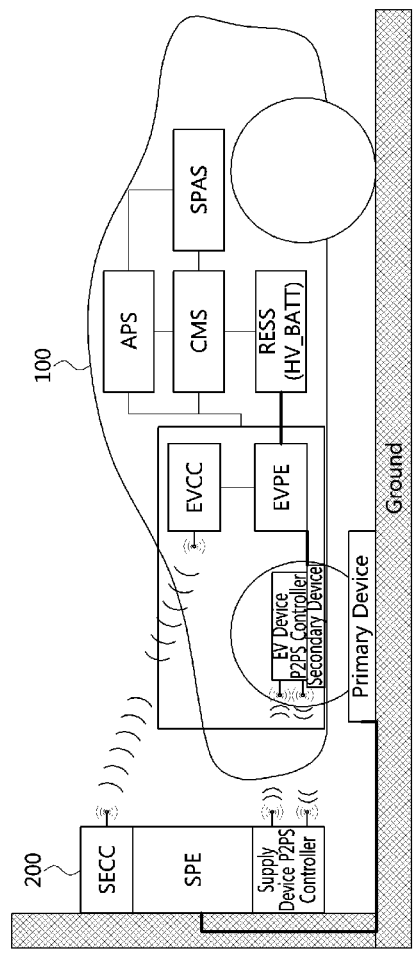
FIG. 12 is a block diagram of a ground assembly and a vehicle assembly for performing a position alignment method according to the present disclosure.

FIG. 12 is a block diagram of a ground assembly and a vehicle assembly for performing a position alignment method according to the present disclosure. In addition, FIG. 12 illustrates configuration of blocks in a vehicle and a power supply device required for wireless charging.

As shown in FIG. 12, a vehicle assembly 100 may include an EV communication controller (EVCC), EV power electronics (EVPE), and EV device point-to-point signal controller (P2PS). Here, the EVCC, EVPE, and EV device P2PS controller may be implemented as one apparatus or hardware.

In this case, the one apparatus may be a position alignment apparatus for performing position alignment with a target GA among a plurality of GAs, and may be implemented to include at least one processor and a memory in which at least one instruction executable by the at least one processor is stored.

The at least one processor may include instructions for recognizing states of a plurality of GAs through wireless communication with an SECC controlling the plurality of GAs, instructions for receiving information on one or more valid GAs among the plurality of GAs from the SECC, instructions for selecting a target GA based on the information on the one or more valid GAs and performing wireless communication association with the target GA, instructions for performing a position alignment approval and authentication procedure by making a request to the SECC, instructions for performing position alignment with the target GA using LF signals when authentication is successful, instructions for transmitting a data set to the SECC using LF signals after the position alignment with the target GA, and instructions for pairing with the target GA based on the data set.

Here, the LF signal given to each GA may be distinguished from the LF signals given to other GAs by a TDM scheme.

Here, the processor may execute the at least one instructions stored in the memory, and may refer to a central processing unit (CPU), a graphics processing unit (GPU), or a dedicated processor in which the methods according to the present disclosure are performed. The memory may be composed of a volatile storage medium and/or a non-volatile storage medium, and may be composed of a read-only memory (ROM) and/or a random access memory (RAM).

The charging station side ground assembly (GA) 200 may include a supply equipment communication controller (SECC), supply power electronics (SPE), supply device point-to-point signal controller (P2PS), and supply device.

Here, the SECC, SPE, and supply device P2PS controller may be implemented as one apparatus or hardware.

In this case, the one apparatus may be a position alignment control apparatus, and may be implemented to include at least one processor and a memory in which at least one instruction executable by the at least one processor is stored.

Meanwhile, the SECC and the EVCC may transmit/receive position alignment related information according to the present disclosure through the WLAN. The EV device P2PS controller and the supply device P2PS controller may exchange position alignment related information according to the present disclosure through the WLAN or LF signals.

Here, the processor may execute the at least one instructions stored in the memory, and may refer to a CPU, a GPU, or a dedicated processor in which the methods according to the present disclosure are performed. The memory may be composed of a volatile storage medium and/or a non-volatile storage medium, and may be composed of a ROM and/or a RAM.

In the description of the position alignment method according to the present disclosure to be followed below, for convenience of description, the EV, VA, and EVCC may be used with the same meaning in that they are subjects performing the position alignment method on a vehicle side. In addition, the EVSE, GA, and SECC may be used with the same meaning in that they are subjects performing the position alignment method on a charging station or power supply device side.

Figure 13:
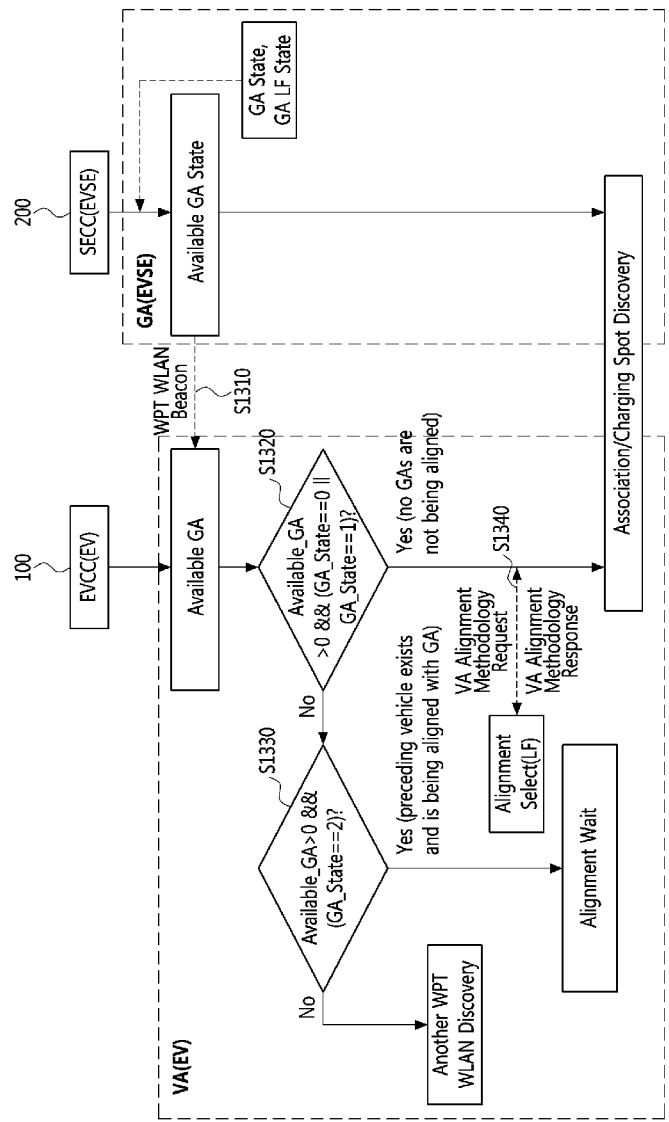
FIG. 13 illustrates an exemplary embodiment of an operational flow in the wireless communication discovery step of the position alignment method according to the present disclosure.

FIG. 13 illustrates an exemplary embodiment of an operational flow in the wireless communication discovery step of the position alignment method according to the present disclosure.

The exemplary embodiment shown in FIG. 13 may be an exemplary embodiment when the SECC 200 discovers the EVCC 100. In this exemplary embodiment, the SECC first provides GA state information to the EVCC. The EVCC may include a charging management system (CMS).

The EVCC (e.g., CMS) of the EV may receive the state information of GAs from the SECC (e.g., central WLAN) of the EVSE, for example, through a WPT WLAN beacon signal at S1310. Here, the state information of the GA may include whether charging is possible, whether there is a failure, information indicating that LF antennas are used as a position alignment scheme, and the like.

Upon receiving the GA state information, the EVCC 100 may check whether there is an available GA and whether a GA_State state message of the available GA indicates a normal state or a charging state based on the information received from the SECC of the EVSE at S1320. As a result of the checking, only when the GA_State indicates the normal or charging state (e.g., GA_State==0 or GA_State==1), the association/charging spot discovery step may be performed. The GA state at this time is a state in which no GAs are being aligned.

As a result of checking the state of the GAs, if there is an available GA but the GA_State state message of the GA indicates an aligned state (e.g., GA_State==2) ('Yes' in step S1330), the EVCC of the EV may proceed to an alignment wait state. That is, for example, this case may be a case in which a preceding vehicle exists and the preceding vehicle is being aligned with the GA.

On the other hand, the EVCC 100 of the EV may request information on the position alignment scheme from the CMS of the EV using a vehicle internal communication (e.g., CAN, Ethernet), and may receive a signal or information indicating that the position alignment is to be performed using the LF from the CMS of the EV at S1340.

As a result of checking the state of the GA, if the GA_State state message indicates a failure, the EV may move and discover to receive wireless communication information for other wireless charging (i.e., 'Another WPT WLAN Discovery').

Figure 14:
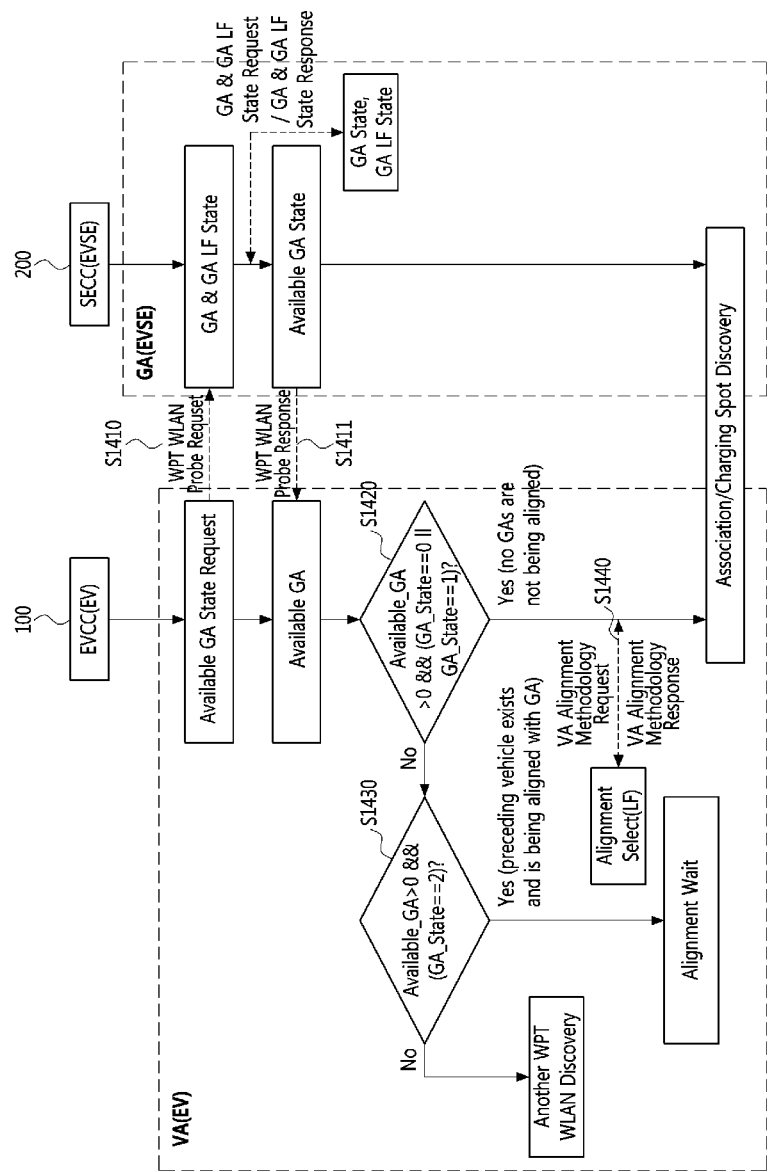
FIG. 14 illustrates another exemplary embodiment of an operational flow in the wireless communication discovery step of the position alignment method according to the present disclosure.

FIG. 14 illustrates another exemplary embodiment of an operational flow in the wireless communication discovery step of the position alignment method according to the present disclosure.

The exemplary embodiment shown in FIG. 14 may be an exemplary embodiment when the EVCC 100 discovers the SECC 200. In this exemplary embodiment, the EVCC of the EV may request wireless charging information from the SECC (e.g., central WLAN) of the EVSE at S1410 (using the LF antenna for position alignment), and may receive the requested information at S1411.

Upon receiving the GA state information, the EVCC 100 may check whether there is an available GA and whether the GA_State state message of the available GA indicates a normal or charging state based on the information received from the SECC of the EVSE at S1420. As a result of the checking, only when the GA_State indicates a normal or charging state (i.e., GA_State==0 or GA_State==1), the association/charging spot discovery step may be performed. The GA state at this time is a state in which no GAs are being aligned.

As a result of checking the state of the GA, if there is an available GA but the GA_State state message of the GA indicates an aligned state (e.g., GA_State=2) ('Yes' in step S1430), the EVCC of the EV may proceed to an alignment wait state. That is, for example, this case may be a case in which a preceding vehicle exists and the preceding vehicle is being aligned with the GA.

As a result of checking the state of the GA, if the GA_State state message indicates a failure, the EV may move and discover to receive wireless communication information for other wireless charging (i.e., 'Another WPT WLAN Discovery').

On the other hand, the EVCC 100 of the EV may request information on the position alignment scheme from the CMS of the EV using a vehicle internal communication (e.g., CAN, Ethernet), and may receive a signal or information indicating that the position alignment is to be performed using the LF from the CMS of the EV at S1440.

Figure 15A:
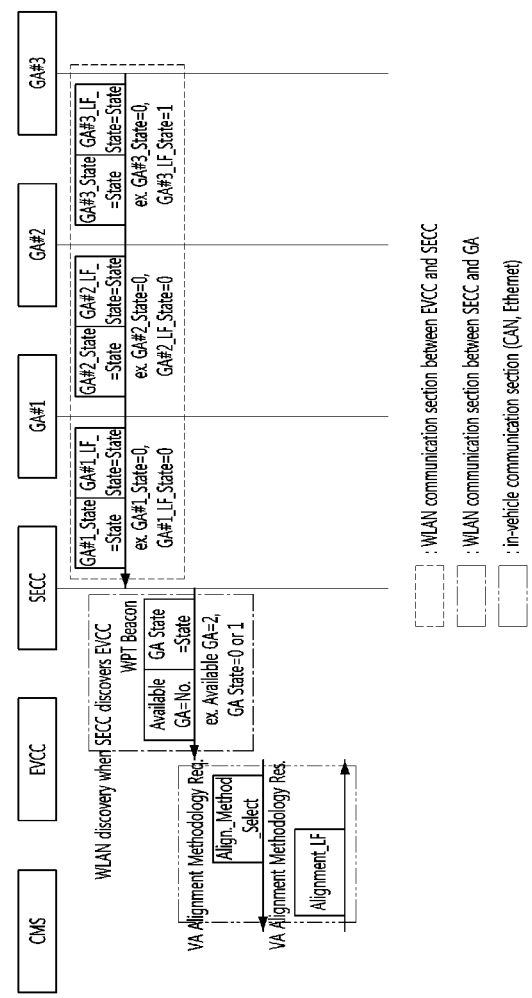
FIGS. 15A and 15B illustrate an example of a flow of detailed messages transferred between components performing relevant operations in the wireless communication discovery step of the position alignment method according to an exemplary embodiment of the present disclosure.
Figure 15B:
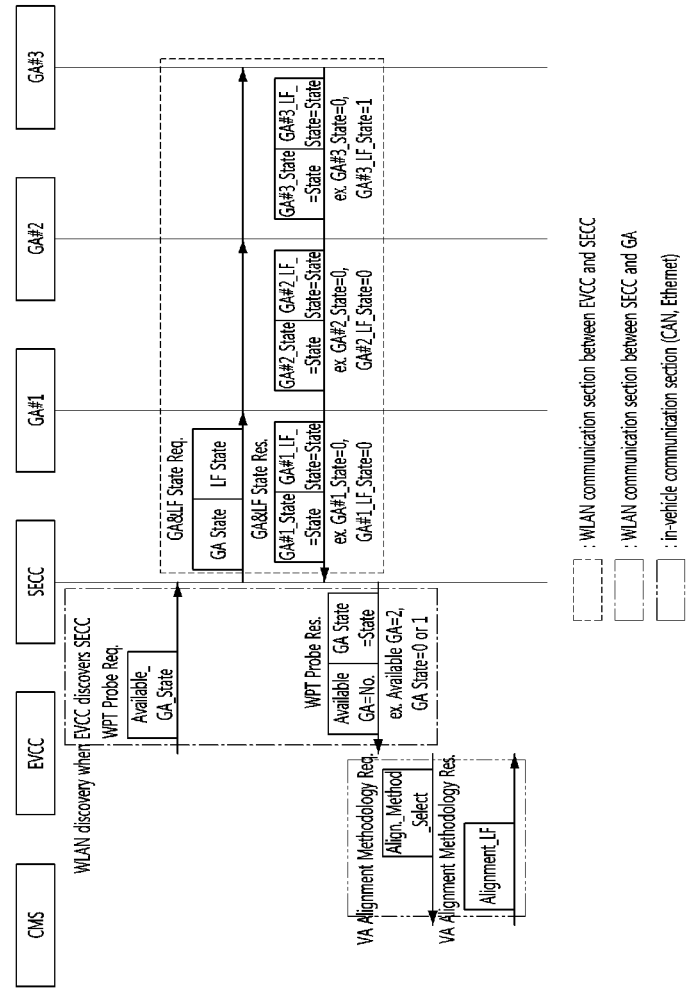

FIGS. 15A and 15B illustrate an example of a flow of detailed messages transferred between components performing relevant operations in the wireless communication discovery step of the position alignment method according to an exemplary embodiment of the present disclosure. In addition, FIGS. 15C and 15D illustrate another example of a flow of detailed messages transferred between components performing relevant operations in the wireless communication discovery step of the position alignment method according to another exemplary embodiment of the present disclosure.

FIGS. 15A and 15B show an example of a state in which a GA_State state message among information received from the SECC of the EVSE indicates a normal or charging state, that is, no GA is being aligned. That is, FIG. 15A shows a WLAN discovery procedure when the SECC discovers the EVCC, and FIG. 15B shows a WLAN discovery procedure when the EVCC discovers the SECC.

Figure 15C:
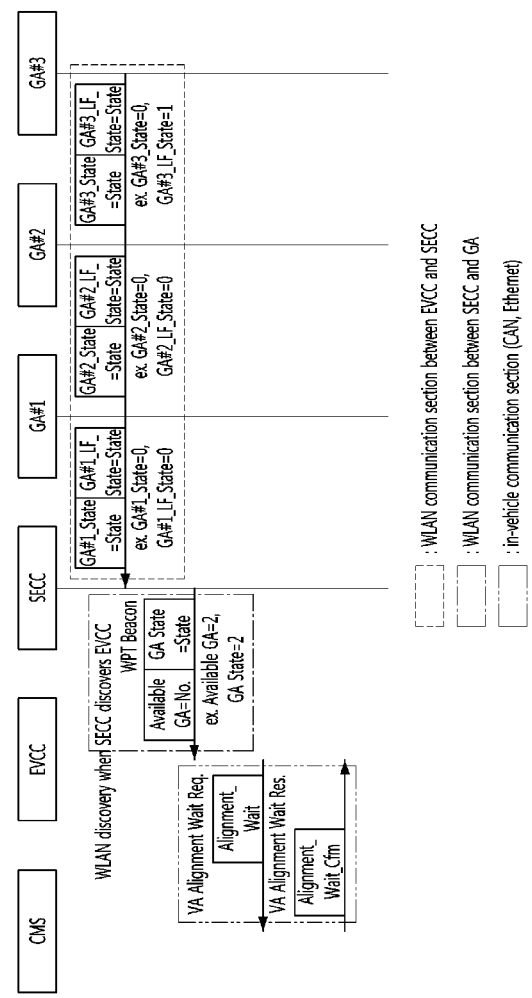
FIGS. 15C and 15D illustrate another example of a flow of detailed messages transferred between components performing relevant operations in the wireless communication discovery step of the position alignment method according to another exemplary embodiment of the present disclosure.
Figure 15D:
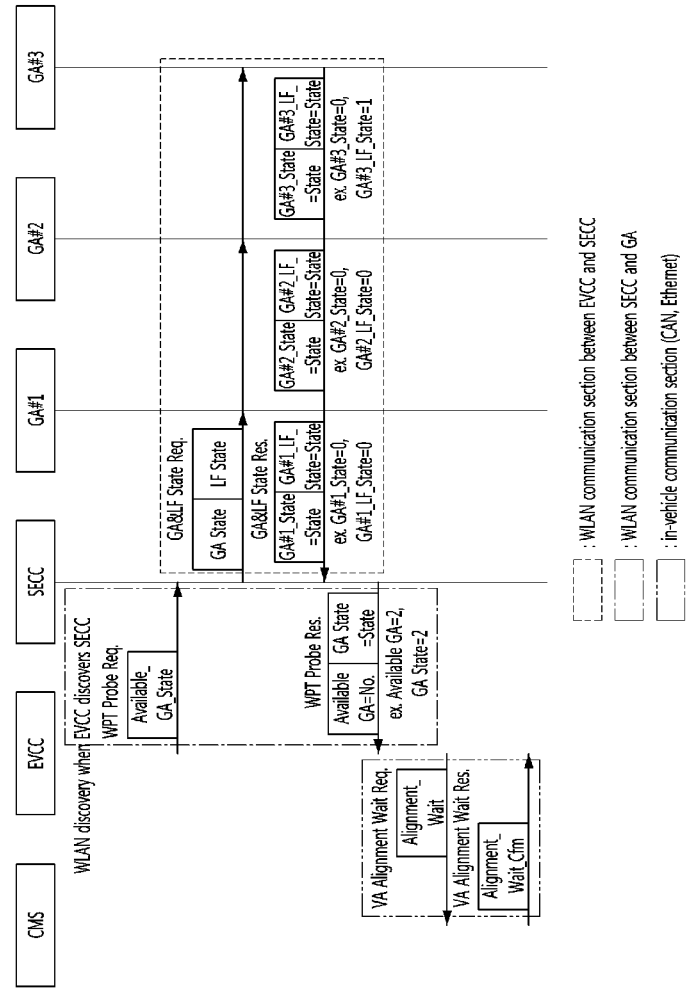

FIGS. 15C and 15D show detailed signals or information exchanged between the EVCC and the SECC or between internal components thereof in the WLAN discovery procedure in a state in which the GA_State state message indicates a aligned state (e.g., there is a preceding vehicle and the preceding vehicle is being aligned with the GA). That is, FIG. 15C shows a WLAN discovery procedure when the SECC discovers the EVCC, and FIG. 15D shows a WLAN discovery procedure when the EVCC discovers the SECC.

The detailed message flow for the related operations in the wireless communication discovery step shown in FIGS. 15A to 15D described above may be performed through cooperation in a WLAN communication section between the EVCC and the SECC, a WLAN communication section between the SECC and the GA, and an in-vehicle communication section. Here, the in-vehicle communication section includes a controller area network (CAN) and an Ethernet network.

Further, as shown in FIGS. 15A and 15C, when the SECC discovers the EVCC, a WPT beacon may be used in the WLAN discovery process. Also, as shown in FIGS. 15B and 15D, when the EVCC discovers the SECC, a WPT probe request may be used in the WLAN discovery process.

Figure 16A:
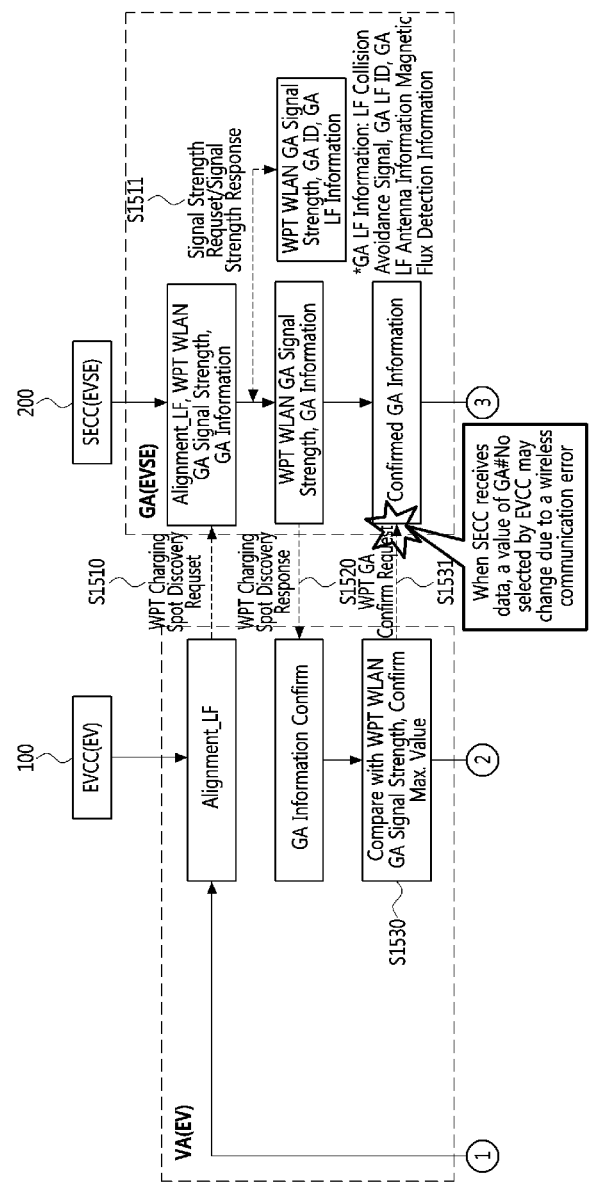
FIGS. 16A and 16B illustrate an exemplary embodiment of an operational flow in the wireless communication association step of the position alignment method according to the present disclosure.
Figure 16B:
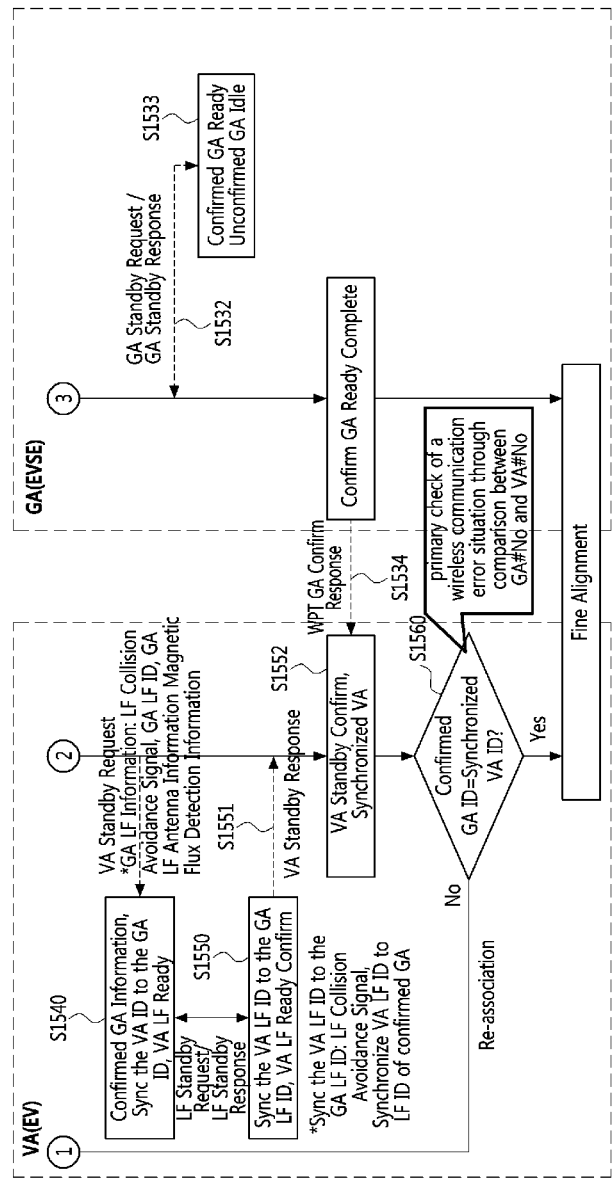

FIGS. 16A and 16B illustrate an exemplary embodiment of an operational flow in the wireless communication association step of the position alignment method according to the present disclosure.

The EVCC 100 and the SECC 200 that have completed wireless communication discovery may proceed to a wireless communication association or charging spot discovery step.

As shown in FIG. 16A, in order to perform wireless communication association, the EVCC of the EV may transmit a communication association request (or WPT charging spot discovery request) to the SECC of the EVSE at S1510. In this case, the EVCC may transmit the request by including information indicating that a position alignment scheme using LF is to be used in the vehicle.

Upon receiving the communication association request, the SECC 200 of the EVSE may request and receive information on a wireless signal strength of each GA from each GA at S1511. In this case, the information provided by the GA to the SECC may include information on an ID of the GA and information on an LF system of the GA as well as its own maximum wireless signal strength. That is, each GA managed by the SECC may transmit information on the maximum wireless signal strength, GA ID, and GA LF information of the corresponding GA to the SECC. Here, unique information of each LF system may include an LF collision-avoidance signal, LF ID of a GA#No., LFA information of the GA#No., and magnetic field detection sensitivity information.

The SECC 200 may provide information on at least one GA under the control of the SECC to the EVCC at S1520. The EVCC 100 may receive information on at least one GA from the SECC, compare wireless signal strengths of a plurality of GAs when there are the plurality of GAs, and select a GA having the highest wireless signal strength at S1530. The EVCC 100 may inform the SECC of the EVSE of information on the selected GA (i.e., GA#No.) at S1531.

The SECC of EVSE may receive information on the selected GA and may inform each GA of the selected GA#No. at S1532. The selected GA may enter a ready state for alignment, and the unselected GAs may enter a standby state for charging with a next vehicle at S1533. When the alignment preparation of the selected GA is completed, the SECC may notify it to the EVCC of the EV at S1534.

Meanwhile, the EVCC may select a GA with the highest signal strength at S1530, assign a VA#No which is the same value as GA#No based on the selected GA at S1540, and inform the CMS of the EV the assigned VA#No. In this case, the EVCC may also inform the information on the LF of the selected GA (i.e., GA#No._LF_Info). Upon receiving the information, the CMS of the EV may inform the APS of the EV of the selected GA's LF information (i.e., GA#No._LF_Info) to prepare for authentication on the LF system between the GA and the VA. Here, the information on the LF of the GA may include an LF collision-avoidance signal, GA LF ID, GA LF antenna information, magnetic field detection sensitivity information, and the like.

The APS of the EV may modify its LF information based on the selected GA's LF information at S1550. In this case, the information modified by the EV may include the LF collision-avoidance signal, SYNC, and VA LF ID.

The CMS of the EV may receive, from the APS of the EV, the modified LF information and information indicating that the APS has completed preparation for position alignment, and deliver the information to the EVCC at S1551. The EVCC may receive, from the CMS of the EV, LF initial information received from the APS of the EV and information for confirming VA#No assigned by the EVCC of the EV at S1552.

The EVCC of the EV may compare the GA ID value (i.e., GA Rdy) returned through the WPT GA Confirm Response from the SECC with the GA ID value (i.e., GA Cfm) processed and delivered through the APS and the CMS, that is, the synchronized VA ID value at S1560. Since the data may be changed due to a wireless communication error when the GA ID value selected by the EVCC is delivered to the SECC, the wireless communication error may be first checked through the above-described comparison process, and it can be prevented from aligning with a wrong GA during alignment due to the wireless communication error.

As a result of the comparison, if the GA ID value returned through the WPT GA Confirm Response and the GA ID value delivered to the SECC are the same, a position alignment execution step, which is a next step, may be performed.

As a result of the comparison, if the GA ID value returned through the WPT GA Confirm Response and the GA ID value delivered to the SECC are different, a wireless communication re-association step (re-discovery of a charging spot) may be performed.

Figure 17A:
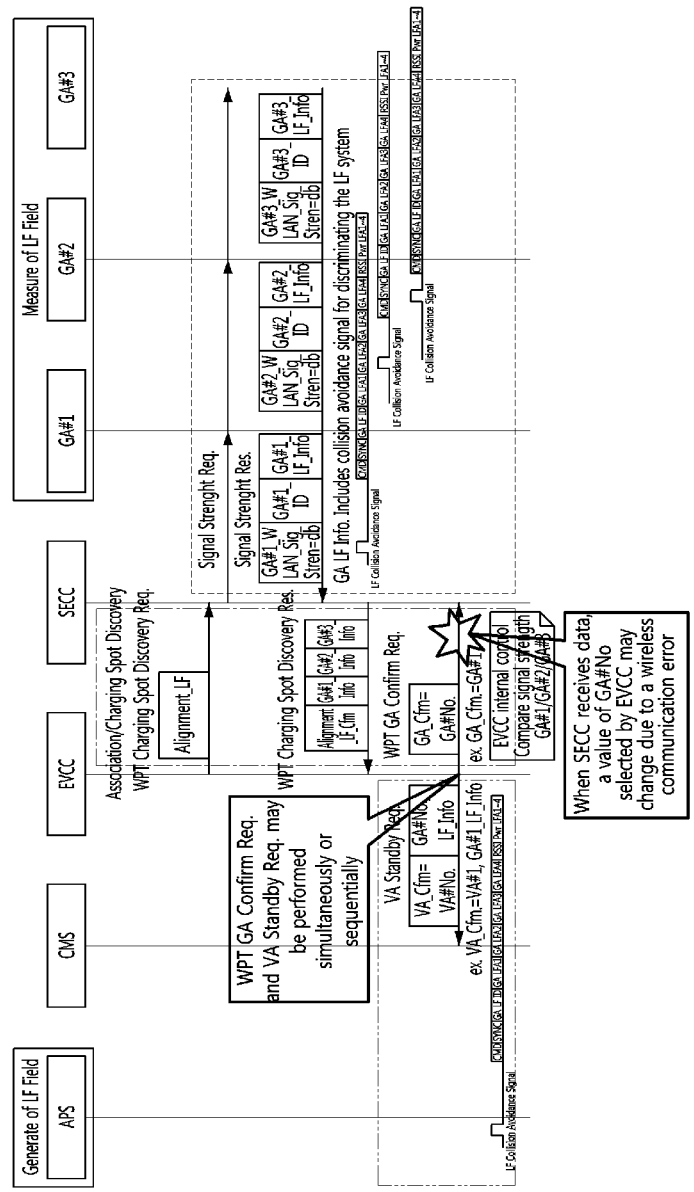
FIGS. 17A and 17B illustrate an example of a flow of detailed messages transferred between components performing relevant operations in the wireless communication association step in the position alignment method according to an exemplary embodiment of the present disclosure.
Figure 17B:
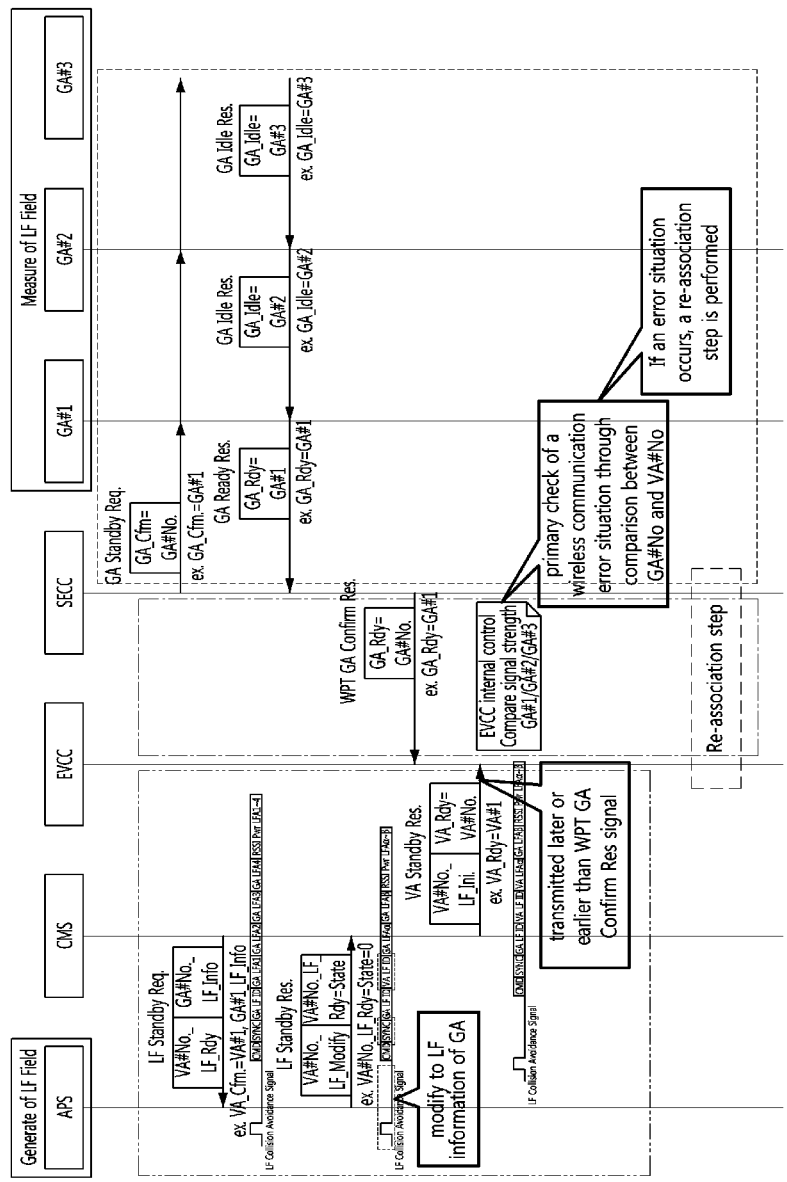

FIGS. 17A and 17B illustrate an example of a flow of detailed messages transferred between components performing relevant operations in the wireless communication association step in the position alignment method according to an exemplary embodiment of the present disclosure.

As shown in FIG. 17A, a detailed configuration of the GA LF information provided by each GA to the SECC at the request of the SECC, that is, a form of a LF telegram may be identified. The GA LF information may also include a collision-avoidance signal for discriminating the LF system. The WPT GA confirmation request (i.e., confirm req.) and the VA standby request (i.e., standby req.) may be processed simultaneously or sequentially.

As shown in FIGS. 17A and 17B, when the number of the GA selected by the EVCC and the number of the GA stored by the SECC do not match, the SECC may identify that an error occurs in the wireless communication in which data transmission/reception is performed.

In addition, the EVCC may check whether a wireless communication error occurs by comparing the GA ID value (i.e., GA Rdy) returned from the SECC with the GA ID value (i.e., GA Cfm) that is internally processed and transmitted by the EVCC, that is, the synchronized VA ID value.

When receiving data from the SECC, a case in which the GA#No selected by the EVCC is changed due to a wireless communication error may occur. When such the wireless communication error occurs, a wireless communication re-association procedure may be performed.

In this case, the APS of the EV may modify the LF collision-avoidance signal, SYNC, and VA LF ID among the LF information of the VA based on the LF information of the selected GA.

The VA wait signal transmitted from the CMS to the EVCC may be transmitted later or earlier than the WPT GA confirmation request signal transmitted from the SECC to the EVCC. The EVCC may primarily check a wireless communication error condition through comparison between the GA#No and the VA#No. If it is recognized that an error condition occurs, the operation mode of the EVCC may proceed to the re-association step.

Figure 18A:
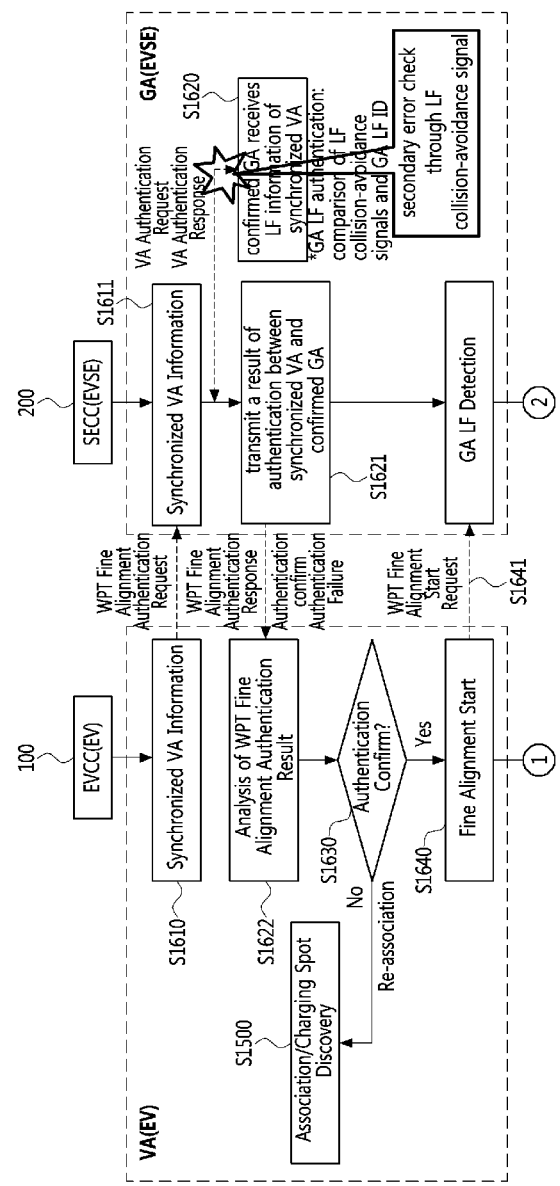
FIGS. 18A and 18B illustrate an exemplary embodiment of an operation flow in the steps of approval and authentication of position alignment, and performing position alignment in the position alignment method according to the present disclosure.
Figure 18B:
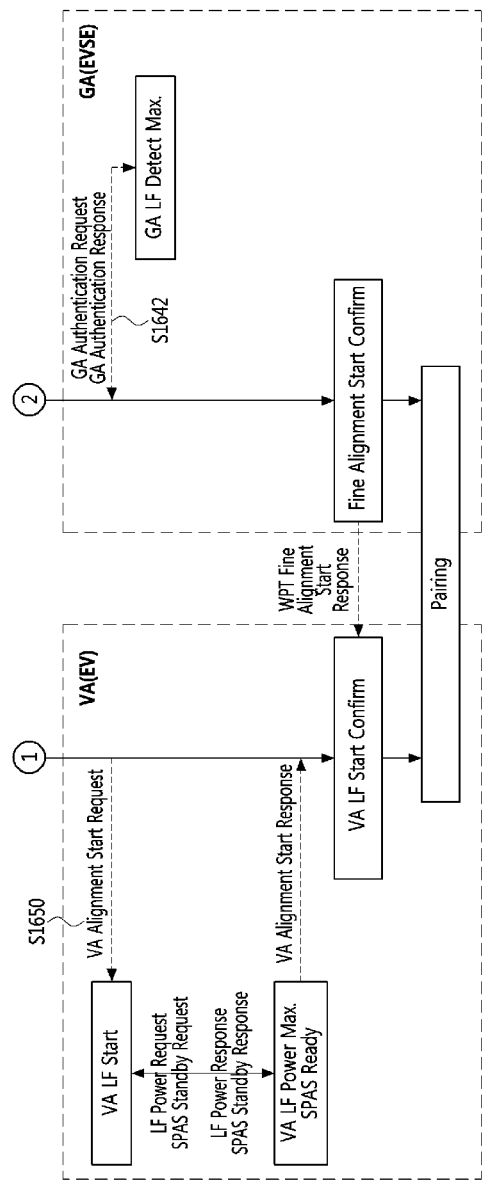

FIGS. 18A and 18B illustrate an exemplary embodiment of an operation flow in the steps of approval and authentication of position alignment, and performing position alignment in the position alignment method according to the present disclosure.

As shown in FIGS. 18A and 18B, the EVCC of the EV may deliver LF initial information of the VA#No to the SECC of the EVSE to perform position alignment at S1610.

The SECC of the EVSE may deliver the LF initial information of the VA to the target GA ready for charging at S1611. The confirmed GA may receive the initial LF information of the synchronized VA at S1620, and compare the information (i.e., GA#No._LF_Info) transmitted by itself in the wireless communication association step (i.e., charging spot discovery) with the initial LF information of the VA, thereby performing authentication of the LF system before performing the position alignment.

Here, items to be checked when the GA performs the authentication may include whether the LF collision-avoidance signal matches, whether the GA LF ID matches, and the like. As a result of the checking, if the corresponding information matches, the GA may return a signal to the SECC indicating that the authentication is successful. That is, the authentication result may be transmitted between the synchronized VA and the confirmed GA at S1621.

As a result of the checking, if the corresponding information does not match, the GA may determine that an error occurs, and may return a signal to the SECC indicating that authentication for the LF system fails. That is, the SECC 200 may perform secondary error verification through the LF collision-avoidance signal and return the result.

The EVCC of the EV may receive, from the SECC of the EVSE, the authentication result of the LF system received from the GA which is the target, and analyze the result at S1622. When confirming the signal indicating that the authentication of the LF system is successful at S1630, the EVCC may proceed to a position alignment start step at S1640. On the other hand, if the signal indicating that the authentication of the LF system is not successful is confirmed, the EVCC of the EV may proceed to the re-association step (re-discovery of a charging spot) at S1500.

On the other hand, if the authentication is successful, the EVCC of the EV may transmit a position alignment start signal to the SECC of the EVSE at S1641. The SECC of the EVSE may request the GA to set a sensing output (i.e., magnetic field sensing sensitivity) of the LF antenna to the maximum at S1642. Upon receiving the request, the GA may set its sensing output of the LF antenna to the maximum and notify the SECC that the sensing output of the LF antenna is maximized.

When the position alignment is started after the successful authentication, the EVCC may transmit a position alignment start signal to the CMS of the EV at S1650. The CMS of the EV may request the APS of the EV to maximize the magnetic field output of the LF antenna. The APS of the EV may maximize the magnetic field output of the LF antenna.

In addition, the CMS of the EV may request a smart parking assistance system (SPAS) to prepare for the position alignment. The APS of the EV may maximize the magnetic field output of the LF antenna and notify it to the CMS of the EV. The CMS of the EV CMS may be informed by the SPAS of the EV that it is ready to start the position alignment. The CMS may notify it to the EVCC, and the EVCC may confirm that the start of fine position alignment with the SECC is approved, and perform the fine position alignment in a pairing atmosphere.

Figure 19A:
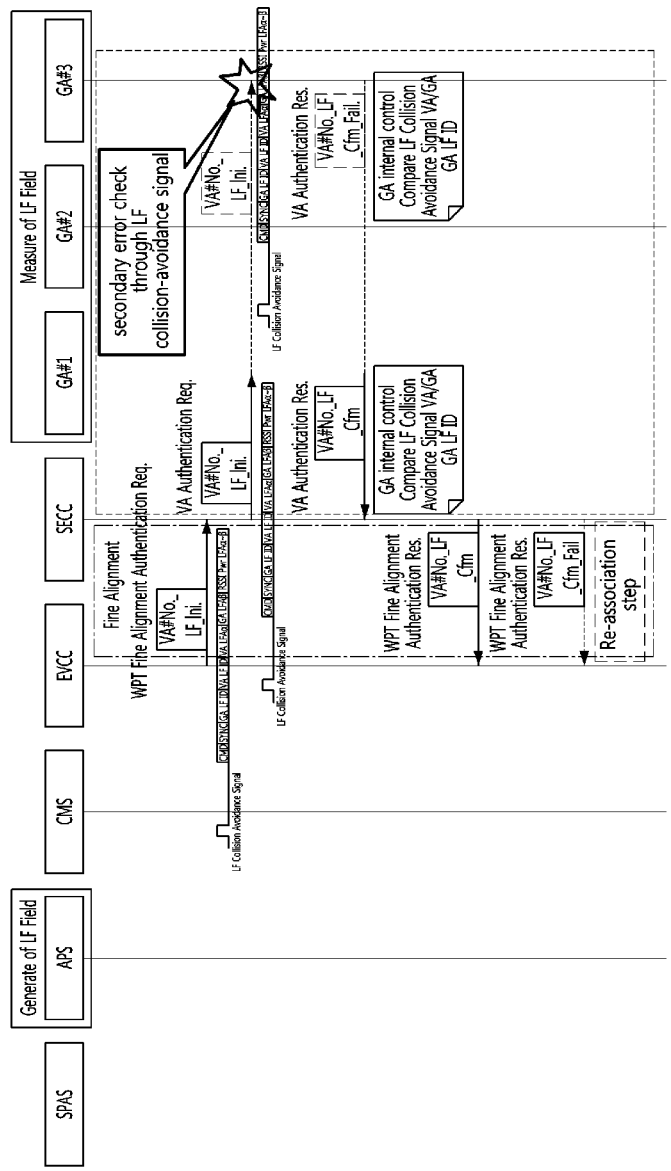
FIGS. 19A and 19B illustrate an example of a flow of detailed messages transferred between components performing relevant operations in the steps of approval and authentication of position alignment, and performing position alignment in the position alignment method according to the present disclosure.
Figure 19B:
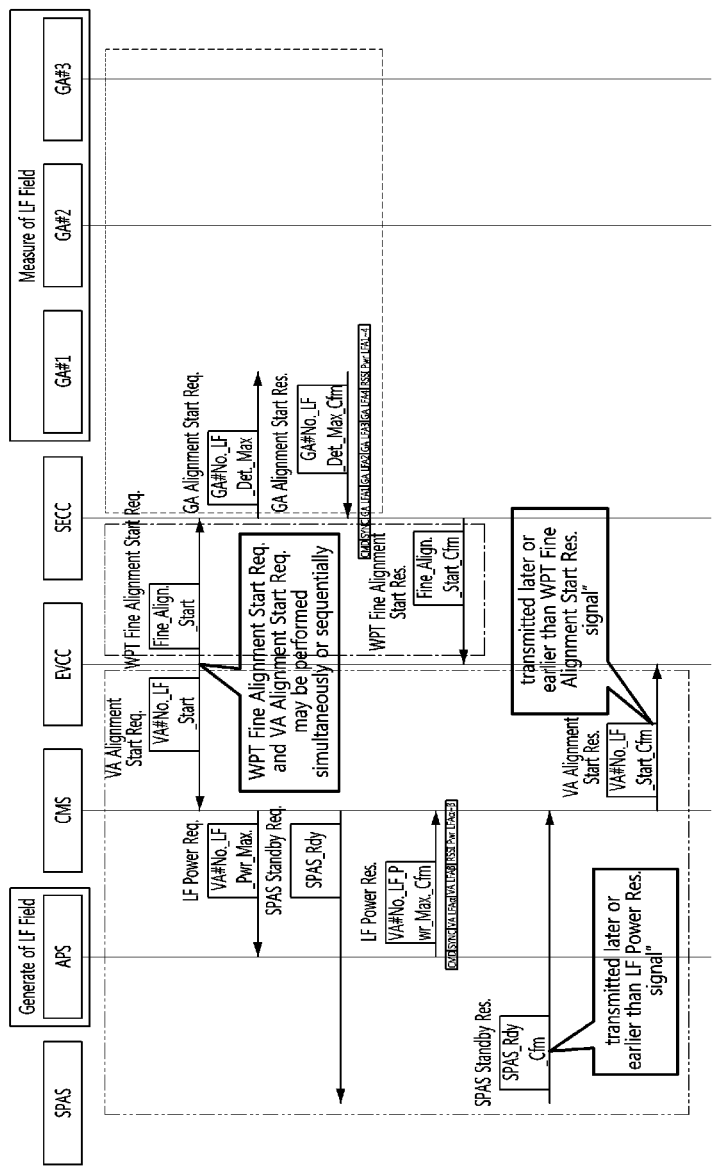

FIGS. 19A and 19B illustrate an example of a flow of detailed messages transferred between components performing relevant operations in the steps of approval and authentication of position alignment, and performing position alignment in the position alignment method according to the present disclosure.

As shown in FIGS. 19A and 19B, the GA that has received the initial LF information of the VA may compare the initial LF information of the VA with the information (i.e., GA#No._LF_Info) transmitted by itself in the wireless communication association step (i.e., charging spot discovery), and perform authentication of the LF system before performing the position alignment. It can be seen that the GA performs error verification by checking whether the LF collision-avoidance signals match when performing the authentication.

The WPT fine position alignment start request and the VA position alignment start request transmitted and received between the CMS and the SECC may be performed simultaneously or sequentially.

The SPAS standby request signal transmitted by the SPAS to the CMS may be transmitted later or earlier than an LF power response signal transmitted from the APS to the CMS.

In addition, the VA position alignment start request transmitted from the CMS to the EVCC may be transmitted later or earlier than the WPT fine position alignment start response transmitted from the SECC to the EVCC.

Figure 19C:
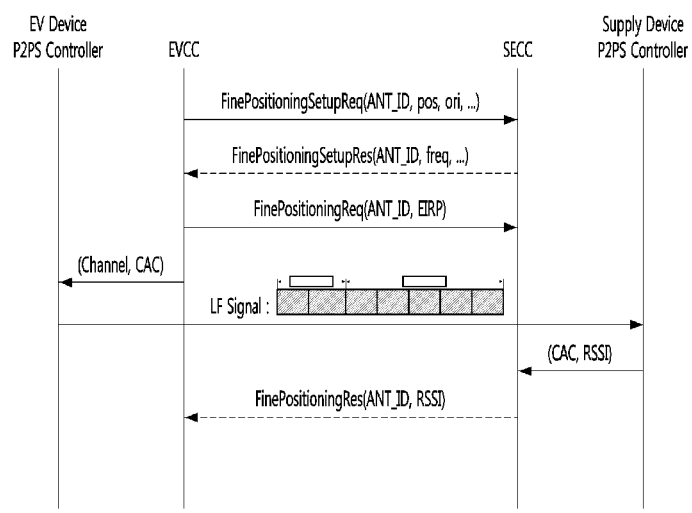
FIG. 19C illustrates an example of a flow of exchanging data during position alignment.

FIG. 19C illustrates an example of a flow of exchanging data during position alignment.

As shown in FIG. 19C, the EVCC may request the SECC to perform a fine position alignment setup, and in this case, an antenna ID (i.e., ANT_ID) may be transmitted together. The SECC may then transmit a response thereto to the EVCC. The response may include information on the antenna ID, frequency, etc.

Upon completion of preparation for the fine position alignment, the EVCC may request fine position alignment from the SECC, and at this time, information on an antenna ID, an effective isotropic radiated power (EIRP), etc. may be transmitted together. In addition, the EVCC may transmit information on a channel, a collision-avoidance code (CAC), etc. in relation to the fine position alignment to the P2PS controller of the EV device.

Meanwhile, the P2PS controller of the EV device may transmit data through an LF signal to the P2PS controller of the power supply device. In addition, the SECC may receive a CAC or received signal strength indicator (RSSI) signal from the P2PS controller of the power supply device and transmit a response for the fine position alignment to the EVCC based on the received RSSI signal.

Figure 19D:
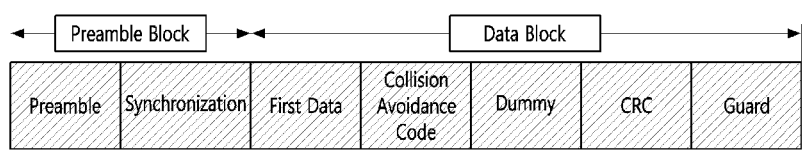
FIG. 19D illustrates an example of data exchanged during fine position alignment.

FIG. 19D illustrates an example of data exchanged during fine position alignment.

As shown in FIG. 19D, data exchanged during fine position alignment may include a preamble block including preamble information for identifying an input signal and synchronization information, and a data block including first data fixed to zeros (0s), a collision-avoidance code (CAC), dummy data, cyclic redundancy check (CRC) information, and guard information.

Here, the preamble block may include the preamble information and the synchronization information, the preamble information may mean information that can identify an input signal to prevent unintended operations in a noisy environment, and the synchronization information may mean a signal for demodulating an LF modulated signal received by the power supply device from the EV device.

Meanwhile, the LF telegram should start with the preamble block to set an LF data threshold. In this case, a duty cycle of the preamble block may be 50%, and a minimum length of the preamble block may be 4 ms (corresponding to an operating frequency of 125 kHz). Meanwhile, if the length of the preamble block is 3.5 ms, it may have an operating frequency of 145 kHz, if the length of the preamble block is 3 ms, it may have an operating frequency of 165 kHz, and if the length of the preamble block is 2.4 ms, it may have an operating frequency of 205 kHz.

In addition, the data block may include the first data, CAC, dummy data, CRC information, and guard information.

Here, the first data may have fixed values of zero (0), and the collision-avoidance code may mean a temporary identifier of each antenna of the EV device to distinguish it from LF signals transmitted from other EV devices. In this case, the CAC for each antenna may be randomly generated in all sessions, and each EV device may have a unique CAC. In addition, the length of the CAC may be 32 bits in order to keep a collision probability of signals between antennas close to zero. Meanwhile, the CAC of each antenna may be transmitted as an antenna ID (i.e., ANT_ID) parameter (refer to ISO15118). Here, a data type of the antenna ID may be an 8-character string representing the CAC in hexadecimal.

On the other hand, the CRC information may be data error detection information. When an LF transmitter starts to transmit an LF signal, an LF receiver may be in a state of continuously receiving data. Therefore, the guard information may mean guard bit(s) for separating a previously transmitted LF signal from a currently transmitted LF signal.

Figure 20:
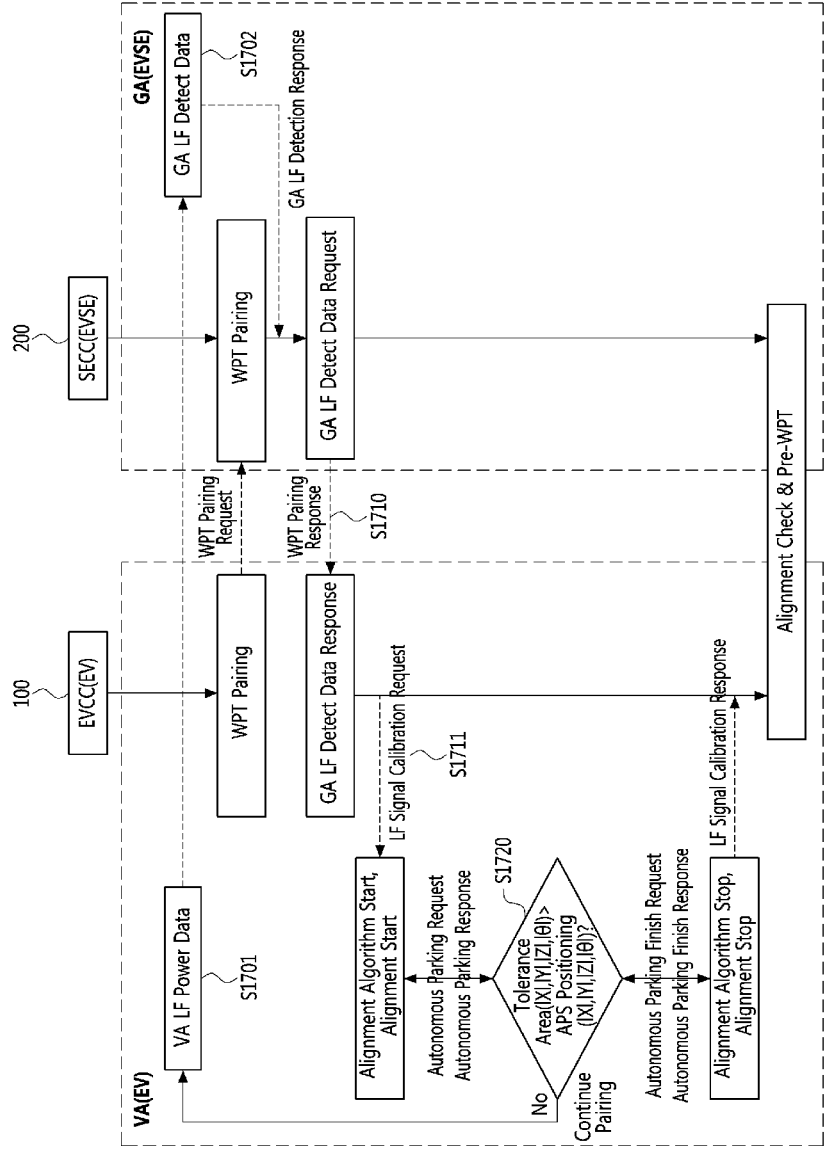
FIG. 20 illustrates an exemplary embodiment of an operational flow in the pairing step of the position alignment method according to the present disclosure.

FIG. 20 illustrates an exemplary embodiment of an operational flow in the pairing step of the position alignment method according to the present disclosure.

As shown in FIG. 20, a magnetic field output (i.e., VA LF power data, S1701) of the LF antenna controlled by the APS of the EV 100 may be detected by the LF antenna of the GA of the EVSE 200 (i.e., GA LF detect data, S1702). The SECC may analyze the detected magnetic field value and transmit the analyzed value to the EVCC of the EV using wireless communication as a WPT pairing response at S1710.

The EVCC of the EV may deliver the analyzed magnetic field strength to the APS of the EV through the CMS of the EV at S1711. The APS of the EV may calculate information (X, Y, Z, θ) of coordinates between the VA of the vehicle and the GA of the infrastructure and a degree of deviation of the vehicle by using a position estimation algorithm (e.g., RSSI, TOF, TODF), and provide basic information required to perform autonomous parking to the autonomous parking system (SPAS). On the other hand, the SPAS of the EV may repeatedly perform an alignment start and an alignment stop until the coordinates received from the APS of the EV reach a certain threshold (i.e., a tolerance area specified by the specification) at S1720.

Here, the VA may transition to an alignment start state after receiving an LF signal calibration request from the EVCC during repeated executions, and after transitioning to an alignment stop state, the VA may transmit an LF signal calibration response to the EVCC.

Figure 21A:
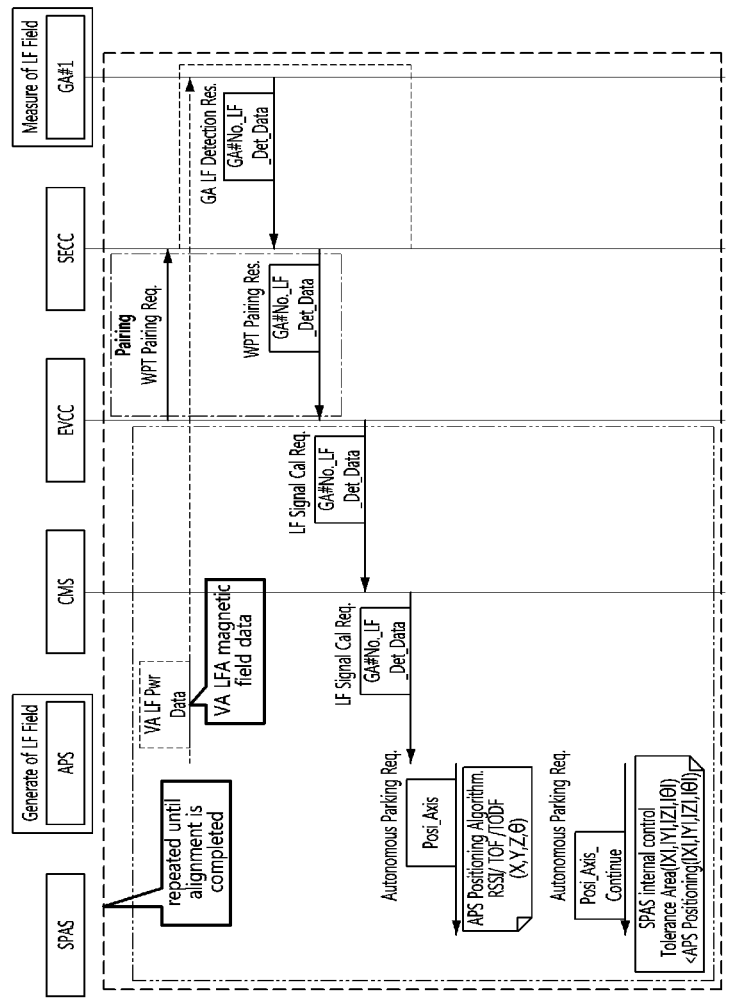
FIG. 21A illustrates an example of a flow of detailed messages transferred between components performing related operations in the pairing step of the position alignment method according to an exemplary embodiment of the present disclosure.
Figure 21B:
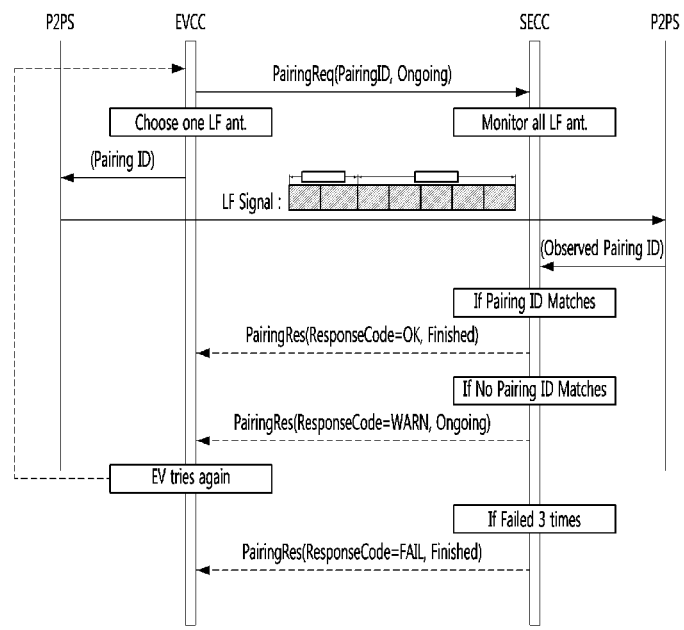
FIG. 21B illustrates an example of the pairing step that may be employed in the position alignment method of FIG. 21A.

FIG. 21A illustrates an example of a flow of detailed messages transferred between components performing related operations in the pairing step of the position alignment method according to an exemplary embodiment of the present disclosure. FIG. 21B illustrates an example of the pairing step that may be employed in the position alignment method of FIG. 21A.

As shown in FIG. 21A, when the EVCC transmits a WPT pairing request to the SECC, the APS of the EV may generate and output an LF magnetic field. The target GA, GA#1, may measure the LF magnetic field and transmit a measured value to the SECC. Then, the SECC may transmit a WPT pairing response to the EVCC, and the EVCC may request the CMS to perform calculation of an LF signal. The CMS may request the APS to perform calculation on the LF signal, and the APS may transmit an autonomous parking request including APS position tracking information to the SPAS. The above-described procedures shown in FIG. 21A may be repeatedly performed until the alignment between the EV and the GA is completed.

The paring step from the perspective of the EVCC of the VA, as shown in FIG. 21B, may comprise a step of requesting pairing to the SECC, transmitting a data set including a pairing ID to the SECC using an LF signal, and a step of receiving a response to the pairing request from the SECC.

In addition, from the perspective of the SECC, the pairing step may comprise a step of receiving the pairing request from the EVCC, a step of receiving the data set including the pairing ID from the EVCC using the LF signal, a step of comparing the pairing ID, and a step of transmitting the response to the pairing request to the EVCC.

Here, after selecting one LF antenna, the EVCC may deliver the pairing ID to the P2PS of the VA. The P2PS of the VA may transmit and receive data with the P2PS of the power supply to which the SECC is connected by using LF signals. The P2PS of the power supply may transmit the observed pairing ID to the SECC.

More specifically, looking at the pairing method using a specific data set, the pairing may be requested by the EVCC to the SECC, and one of a plurality of LF antennas of the SECC may be selected by the EVCC. In this case, the SECC may monitor all of the LF antennas of the EVCC. Subsequently, the data set may be transmitted from the P2PS controller of the EVCC to the P2PS controller of the SECC through LF signals. In this case, the data set may include the pairing ID.

Meanwhile, when the pairing ID matches, the SECC may transmit a response indicating that the pairing is complete to the EVCC. If there is no matching pairing ID, a warning response may be transmitted to the EVCC, and the EVCC may reattempt the pairing. Here, if the pairing attempt fails three times, the SECC may transmit a pairing failure response to the EVCC.

Figure 21C:
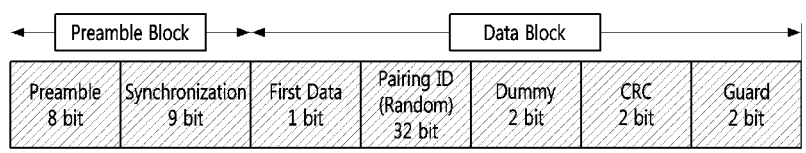
FIG. 21C illustrates an example of a dataset that may be applied to the pairing step of FIG. 21B.

FIG. 21C illustrates an example of a dataset that may be applied to the pairing step of FIG. 21B.

As shown in FIG. 21C, the data set exchanged between the EVCC and the SECC may include a preamble block including preamble information for identifying an input signal and synchronization information, and a data block including first data fixed to zeros (0s), a paring ID assigned arbitrarily, dummy data, CRC information, and guard information.

Here, the preamble block may include preamble information and synchronization information, the preamble information may mean information that can identify an input signal to prevent unintended operations in a noisy environment, and the synchronization information may mean a signal for demodulating an LF modulated signal received by the supply device from the EV device.

The LF telegram should start with the preamble block to set an LF data threshold. In this case, a duty cycle of the preamble block may be 50%, and a minimum length of the preamble block may be 4 ms (corresponding to an operating frequency of 125 kHz). Meanwhile, if the length of the preamble block is 3.5 ms, it may have an operating frequency of 145 kHz, if the length of the preamble block is 3 ms, it may have an operating frequency of 165 kHz, and if the length of the preamble block is 2.4 ms, it may have an operating frequency of 205 kHz.

In addition, the data block may include the first data, pairing ID, dummy data, CRC information, and guard information.

Here, the first data may have fixed values of zero (0), the pairing ID may be given as an arbitrary number of 32 bits, the CRC information may be data error detection information. When an LF transmitter starts to transmit an LF signal, an LF receiver may be in a state of continuously receiving data. Therefore, the guard information may mean guard bit(s) for separating a previously transmitted LF signal from a currently transmitted LF signal.

Figure 21D:
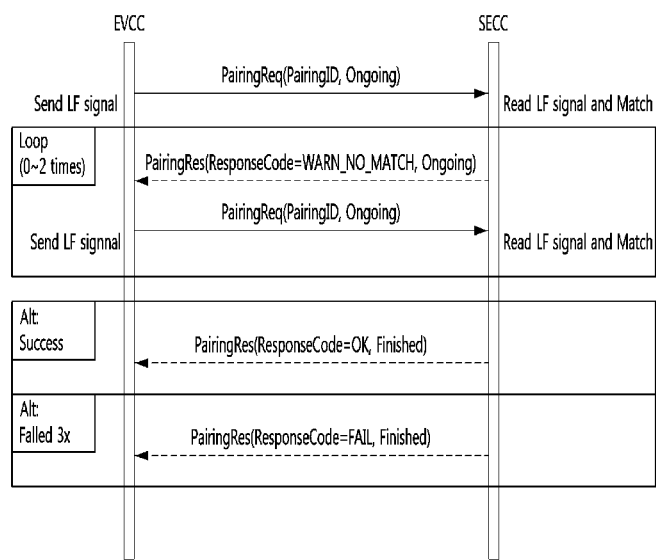
FIG. 21D is an exemplary diagram of a pairing procedure between the EVCC and the SECC using the data set of FIG. 21C.

FIG. 21D is an exemplary diagram of a pairing procedure between the EVCC and the SECC using the data set of FIG. 21C.

As shown in FIG. 21D, the EVCC may transmit a pairing request to the SECC. This process may be performed in a scheme in which the EVCC transmits an LF signal. The LF signal may include a pairing ID and status information on the pairing in progress. The SECC may receive the LF signal and check whether the pairing ID in the LF signal matches.

Then, when the pairing ID does not match, the SECC may transmit a pairing response including a warning and information on the pairing ID mismatch to the EVCC. The EVCC may transmit an LF signal again to request the pairing, and the SECC may repeat the process of receiving the LF signal and checking the pairing ID in the LF signal a predetermined number of times, for example, three times.

Meanwhile, if the pairing is successful because the pairing ID matches, the SECC may transmit a pairing response including OK information to the EVCC and complete the pairing.

On the other hand, if the pairing fails because the pairing ID does not match three times, the SECC may transmit a pairing response including failure information to the EVCC and terminate the pairing procedure.

Figure 22A:
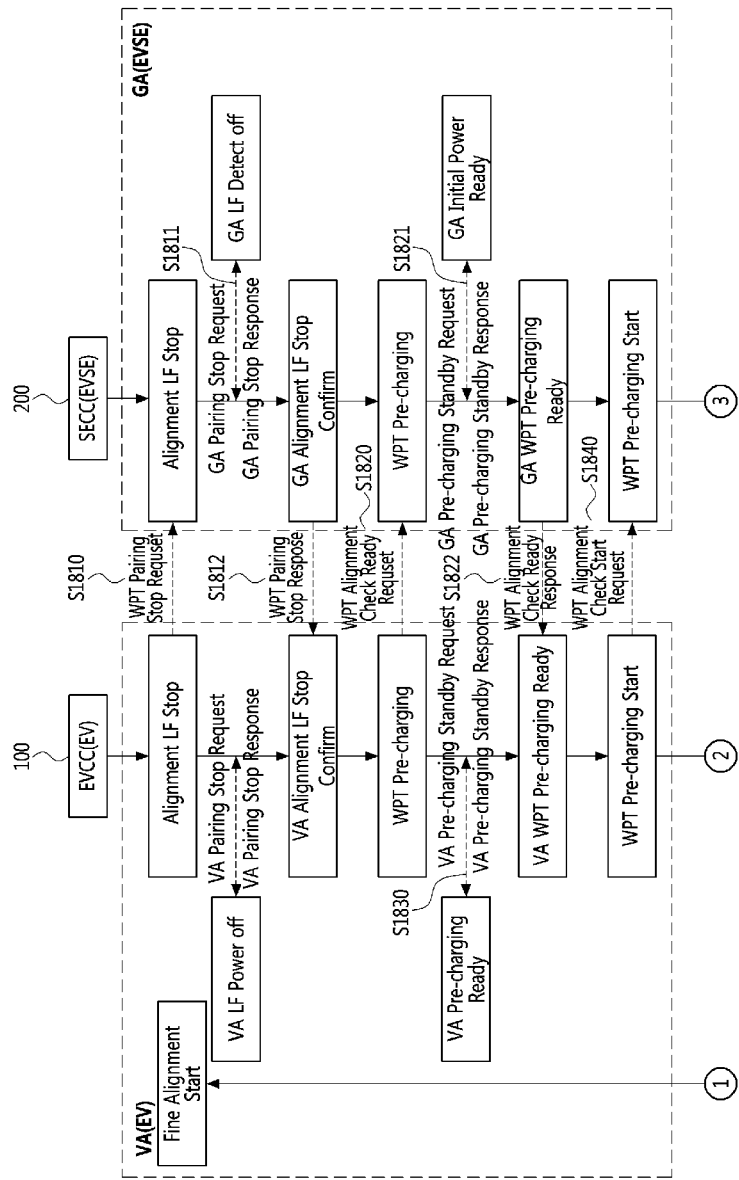
FIGS. 22A and 22B illustrate an exemplary embodiment of an operational flow in the position alignment termination or WPT pre-preparation step of the position alignment method according to the present disclosure.
Figure 22B:
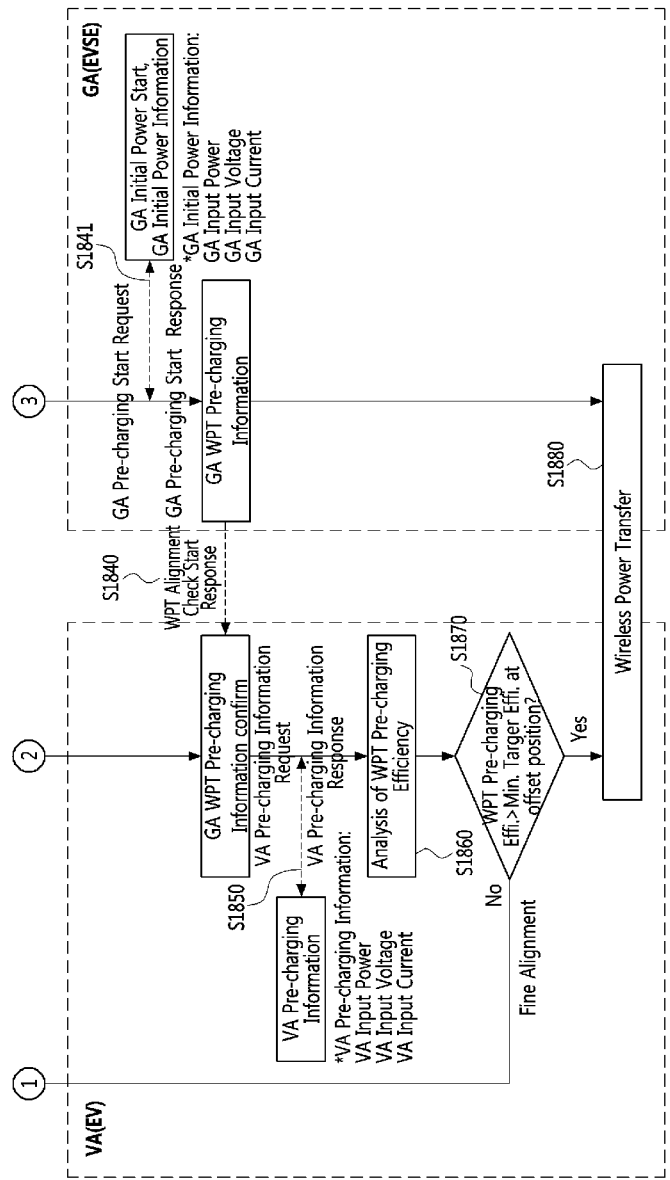

FIGS. 22A and 22B illustrate an exemplary embodiment of an operational flow in the position alignment termination or WPT pre-preparation step of the position alignment method according to the present disclosure.

In the wireless charging pre-preparation (i.e., WPT pre-charging) step, the SPAS of the EV may notify the CMS of the EV that the alignment has been completed when coordinates received from the APS of the EV exceed a certain threshold (i.e., tolerance area specified by the specification). The CMS of the EV CMS may transmit a confirmation signal to the SPAS of the EV and request the APS of the EV to stop outputting the LF antenna magnetic field in order to confirm whether the position alignment is completed. The CMS of the EV may receive a signal that the LF antenna magnetic field output has been stopped from the APS of the EV, and transmit a LF position alignment stop signal to the SECC of the EVSE to the EV's EVCC to check whether the position alignment is completed.

Then, as shown in FIG. 22A, the EVCC of the EV may request a position alignment stop signal using the LF from the SECC of the EVSE at S1810. The SECC of the EVSE may request the EVSE of the GA to stop a sensing output (i.e., magnetic field sensing sensitivity) of the LF antenna at S1811. The SECC of the EVSE may be notified by the GA of the EVSE that the LF antenna sensing output has been stopped, and transmit a position alignment stop confirmation signal using the LF to the EVCC of the EV at S1812.

Then, the EVCC of the EV may request a pre-wireless charging power supply preparation signal from the SECC of the EVSE to confirm the position alignment and whether wireless charging is possible at S1820. The SECC of the EVSE may request the GA of the EVSE to prepare for pre-wireless charging power supply at S1821. Here, a pre-wireless charging power used may be smaller than a maximum charging power required by the vehicle. This is because the electric vehicle charging has a structure in which the EV takes as much power as needed rather than being unilaterally power-supplied by a power grid.

Then, when the SECC of the EVSE receives a signal from the GA of the EVSE informing that it can supply power for pre-wireless charging, the SECC may transmit, to the EVCC of the EV, a pre-wireless charging power supply ready signal to confirm the position alignment and whether wireless charging is possible at S1822.

On the other hand, in order to confirm the alignment and whether wireless charging is possible, the EVCC of the EV may request a preparation signal for receiving the pre-wireless charging power from the CMS of the EV at S1830. The CMS of the EV may request the VA of the EV to prepare to receive the power for pre-wireless charging, and receives a signal from the VA of the EV that it is ready to receive the power for pre-wireless charging. The EVCC of the EV may receive the signal from the CMS of the EV indicating that it is ready to receive the power for pre-wireless charging.

When the preparation for pre-wireless charging is completed, the EVCC of the EV may request the SECC of the EVSE to supply the pre-wireless charging power at S1840. The SECC of the EVSE may request the pre-wireless charging power supply from the GA of the EVSE, and receive, from the GA of the EVSE, a signal informing that wireless power supply has started and pre-wireless charging power supply information supplied by the GA of the EVSE. Here, the pre-wireless charging power supply information provided by the GA of the EVSE may be information on an input power supplied by the GA of the EVSE for the CMS to calculate a charging efficiency.

Then, as shown in FIG. 22B, the GA of the EVSE may supply the pre-wireless charging power to the EV. The EVCC of the EV may receive, from the SECC of the EVSE, the signal informing that wireless power supply has started and the pre-wireless charging power supply information supplied by the GA of the EVSE at S1842. The CMS of the EV may receive, from the EVCC of the EV, the signal informing that the wireless power supply has started and the pre-wireless charging power supply information supplied by the GA of the EVSE. The CMS of the EV may request and receive the pre-wireless charging power supply information from the VA of the EV at S1850.

Here, the pre-wireless charging power supply information requested from the VA of the EV is for calculating a charging efficiency by the CMS, and may be an output power supplied by the VA of the EV to a Battery Management System (BMS). The CMS of the EV may calculate a ratio of an output power (e.g., VA input power) supplied by the EV's VA to the EV's BMS to an input power supplied by the EVSE's GA, that is, a pre-wireless charging efficiency, using an internal algorithm at S1860. Here, if the pre-wireless charging efficiency is lower than or equal to a minimum required efficiency at an offset position ('No' in step S1870), the steps from the fine alignment step may be perform again. In other words, returning to the specific step S1640 shown in FIG. 18A, the CMS of the EV may request the EVCC of the EV to restart the position alignment, and the EVCC of the EV may request the SECC of the EVSE to restart the position alignment.

On the other hand, if the pre-wireless charging efficiency is higher than the minimum required efficiency at the offset position ('Yes' in step S1870), a regular wireless charging power transfer step may be performed at S1880. In this case, the CMS of the EV may request the EVCC of the EV to supply a regular wireless charging power, and inform the VA of the EV that the regular wireless charging power is supplied. The processes thereafter may be the same as those for EV wired charging.

Figure 23A:
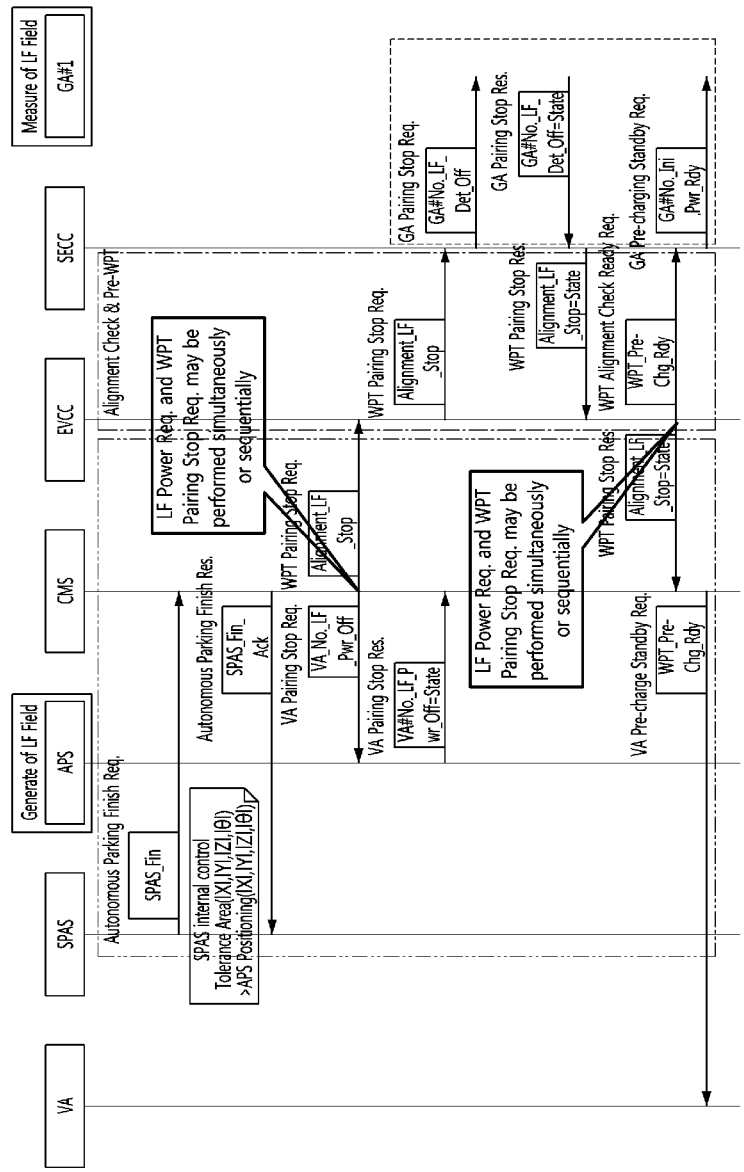
FIGS. 23A, 23B, and 23C illustrate an example of a flow of detailed messages transferred between components performing related operations in the position alignment termination or wireless charging pre-preparation step of the position alignment method according to an exemplary embodiment of the present disclosure.
Figure 23B:
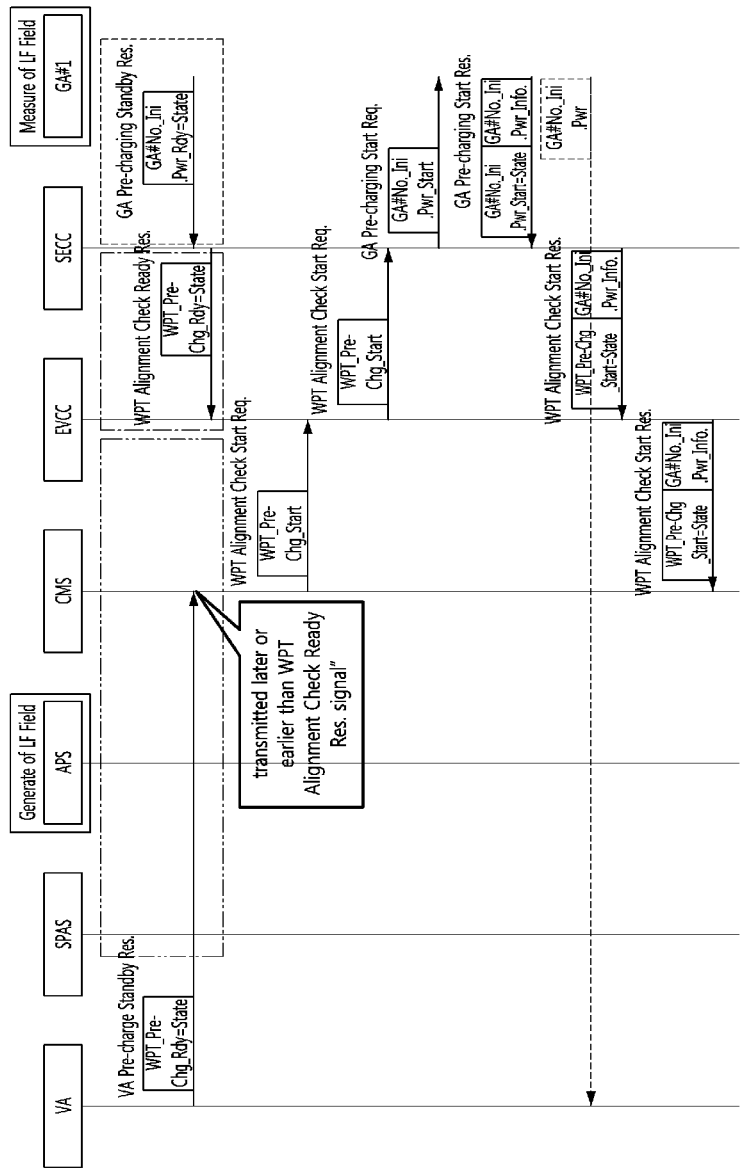
Figure 23C:
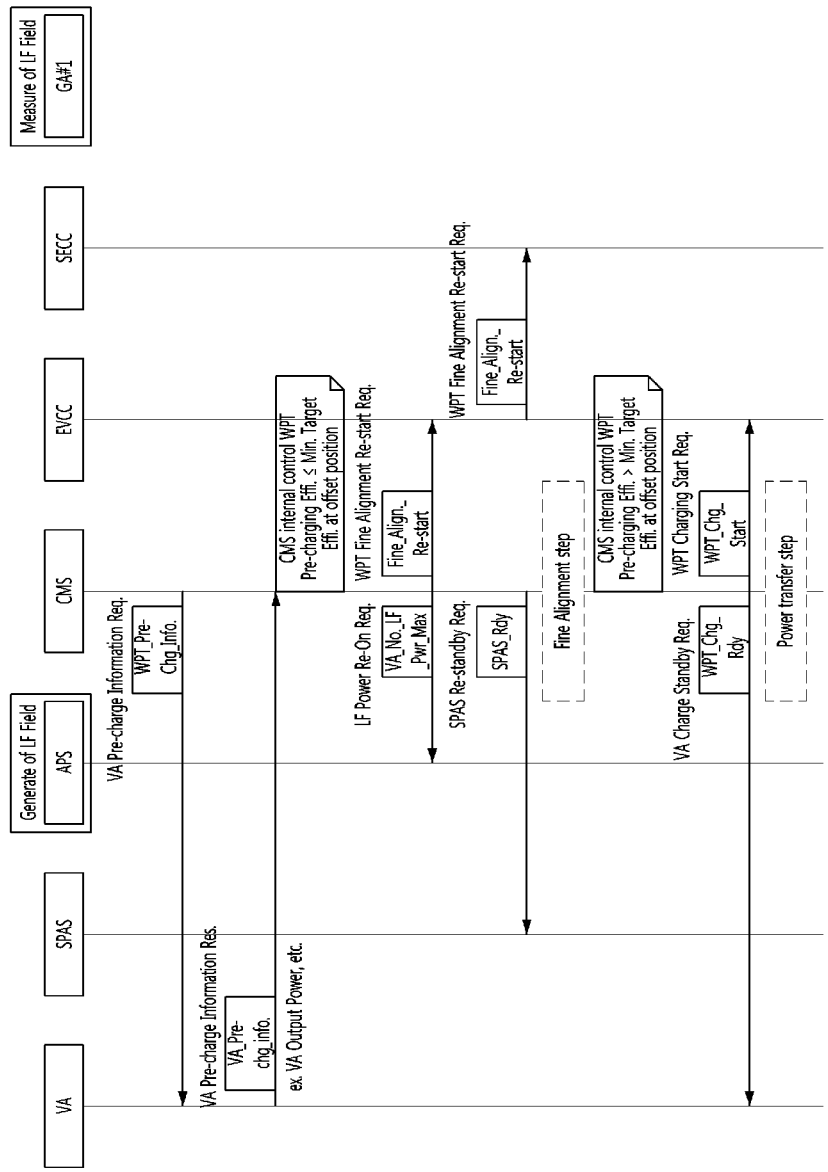

FIGS. 23A, 23B, and 23C illustrate an example of a flow of detailed messages transferred between components performing related operations in the position alignment termination or wireless charging pre-preparation step of the position alignment method according to an exemplary embodiment of the present disclosure.

As shown in FIG. 23A, the SPAS of the VA may transmit an autonomous parking finish request signal to the CMS. In this case, internal controls of the SPAS may be performed when the tolerance area is larger than the APS position tracking information.

Then, the CMS may transmit an automatic parking finish response to the SPAS. Then, the CMS may transmit a VA pairing stop request signal to the APS and transmits a WPT pairing stop request signal to the EVCC. The APS may transmit a pairing stop request response signal to the CMS, and the EVCC may transmit a WPT pairing stop request to the SECC.

Then, the SECC may transmit a GA pairing stop request signal to a specific GA (e.g., GA#1), and the GA#1 may transmit a GA pairing stop response signal to the SECC. Then, the SECC transmits a WPT pairing stop request signal to the EVCC.

Then, the EVCC may transmit a WPT pairing stop response to the CMS and transmit a WPT alignment check preparation request signal to the SECC. The CMS may transmit a VA pre-charge standby request signal to the VA. In addition, the SECC may transmit a GA pre-charge standby request signal to the GA#1.

Then, as shown in FIG. 23B, the GA#1 may transmit a pre-charge standby response signal to the SECC, and the SECC may transmit a WPT position alignment confirmation preparation response signal to the EVCC. In addition, the VA may transmit a VA pre-charge standby response signal to the CMS. In this case, the VA pre-charge standby response signal may be transmitted later or earlier than the WPT position alignment confirmation preparation response signal.

Then, the CMS may transmit a WPT alignment check start request signal to the EVCC. The EVCC may transmit a position alignment check start request signal to the SECC, and the SECC may transmit a GA pre-charge start request signal to the GA#1.

Then, the GA#1 may transmit a GA pre-charge start response signal to the SECC, the SECC may transmit a WPT position alignment check start response signal to the EVCC, and the EVCC may transmit a WPT position alignment check start response to the CMS.

Then, as shown in FIG. 23C, the CMS may transmit a VA pre-charge information request signal to the VA, and the VA may transmit a VA pre-charge information response signal to the CMS. The CMS may determine whether a WPT pre-charge efficiency is less than or equal to a minimum target efficiency at an offset position through internal controls of the CMS.

Then, the CMS may transmit an LF power re-on request signal to the APS and transmit a WPT fine position alignment re-start request signal to the EVCC. In addition, the CMS may transmit a SPAS re-standby request signal to the SPAS. Then, the EVCC may transmit a WPT fine position alignment restart request signal to the SECC. Through this process, the CMS may perform the fine position alignment step again.

Then, during the fine position alignment step, the CMS may determine whether the WPT pre-charge efficiency is greater than a minimum reference efficiency at the offset position through internal controls thereof, and if the WPT pre-charge efficiency is greater than the minimum reference efficiency, the CMS may transmit a VA charging standby request signal to the VA, and transmit a WPT charge start request signal to the EVCC. Through this process, a power transfer step may be performed in a wireless scheme between the VA and the power supply of the wireless power charging station.

Some aspects of the present disclosure have been described above in the context of a device but may be described using a method corresponding thereto. Here, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, at least one of most important operations of the method may be performed by such a device.

In embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While the present disclosure has been described above with respect to embodiments thereof, it would be understood by those of ordinary skill in the art that various changes and modifications may be made without departing from the technical conception and scope of the present disclosure defined in the following claims.

The invention claimed is:

1. A position alignment method for wireless charging, performed by a vehicle assembly (VA) to perform position alignment with a target ground assembly (GA) among a plurality of GAs, the position alignment method comprising:
recognizing, by a processor, states of the plurality of GAs through wireless communication with a supply equipment communication controller (SECC) controlling the plurality of GAS;
receiving, by the processor, information on one or more valid GAs among the plurality of GAs from the SECC;
selecting, by the processor, a target GA based on the information on the one or more valid GAs, and performing wireless communication association with the target GA;
performing, by the processor, a position alignment approval and authentication procedure by making a request to the SECC;
performing, by the processor, position alignment with the target GA using low frequency (LF) signals when authentication is successful;
transmitting, by the processor, a data set to the SECC using LF signals after the position alignment with the target GA; and
performing, by the processor, pairing with the target GA based on the data set;
wherein the data set includes:
a preamble block including preamble information for identifying an input signal and synchronization information; and
a data block including first data fixed to zeros, a collision-avoidance code including a temporary identifier of each antenna, dummy data, cyclic redundancy check (CRC) information, and guard information.

2. The position alignment method according to claim 1, wherein performing pairing comprises:
requesting pairing to the SECC;
transmitting the data set including a pairing ID to the SECC using LF signals; and
receiving a response to the pairing request from the SECC.

3. The position alignment method according to claim 1, wherein the information on the one or more valid GAs includes at least one of a GA ID for each GA, unique information of an LF system, wireless signal strength information, or combinations thereof.

4. The position alignment method according to claim 3, wherein the unique information of the LF system includes at least one of information on an LF collision-avoidance signal assigned to each GA, LF ID, LF antenna information, magnetic field detection sensitivity for each antenna, or combinations thereof.

5. The position alignment method according to claim 1, wherein selecting the target GA based on the information on the one or more valid GAs comprises:
comparing wireless signal strengths of the one or more valid GAs; and
selecting a GA with a highest wireless signal strength as the target GA.

6. The position alignment method according to claim 1, wherein the state of the GA indicates a normal state in which charging is possible, a state in which charging is being performed, or a state in which alignment is being performed.

7. The position alignment method according to claim 1, wherein selecting the target GA based on the information on the one or more valid GAs and performing of the wireless communication association with the target GA comprises modifying LF information of the VA based on LF information of the selected target GA.

8. A position alignment apparatus for performing position alignment with a target ground assembly (GA) among a plurality of GAs, the position alignment apparatus comprising:
at least one processor; and
a memory storing at least one instruction executable by the at least one processor, wherein when executed by the at least one processor, the at least one instruction causes the position alignment apparatus to:
recognize states of the plurality of GAs through wireless communication with a supply equipment communication controller (SECC) controlling the plurality of GAs;
receive information on one or more valid GAs among the plurality of GAs from the SECC;
select a target GA based on the information on the one or more valid GAs, and perform wireless communication association with the target GA;
perform a position alignment approval and authentication procedure by making a request to the SECC;
perform position alignment with the target GA using low frequency (LF) signals when authentication is successful;
transmit a data set to the SECC using LF signals after the position alignment with the target GA; and perform pairing with the target GA based on the data set;
wherein the data set includes:
- a preamble block including preamble information for identifying an input signal and synchronization information; and
- a data block including first data fixed to zeros, a collision-avoidance code including a temporary identifier of each antenna, dummy data, cyclic redundancy check (CRC) information, and guard information.

9. The position alignment apparatus according to claim 8, wherein in performing of the pairing, the at least one instruction causes the position alignment apparatus to:
request pairing to the SECC;
transmit the data set including a pairing ID to the SECC using LF signals; and
receive a response to the pairing request from the SECC.

10. The position alignment apparatus according to claim 8, wherein the information on the one or more valid GAs includes at least one of a GA ID for each GA, unique information of an LF system, wireless signal strength information, or combinations thereof.

11. The position alignment apparatus according to claim 10, wherein the unique information of the LF system includes at least one of information on an LF collision-avoidance signal assigned to each GA, LF ID, LF antenna information, magnetic field detection sensitivity for each antenna, or combinations thereof.

12. The position alignment apparatus according to claim 8, wherein in selecting of the target GA based on the information on the one or more valid GAs, the at least one instruction causes the position alignment apparatus to:
compare wireless signal strengths of the one or more valid GAs; and
select a GA with a highest wireless signal strength as the target GA.

13. The position alignment apparatus according to claim 8, wherein the state of the GA indicates a normal state in which charging is possible, a state in which charging is being performed, or a state in which alignment is being performed.

14. The position alignment apparatus according to claim 8, wherein in selecting of the target GA based on the information on the one or more valid GAs and performing of the wireless communication association with the target GA, the at least one instruction causes the position alignment apparatus to modify LF information of the VA based on LF information of the selected target GA.

15. A position alignment method for wireless charging, performed by a supply equipment communication controller (SECC) controlling a plurality of ground assemblies (GAs), the position alignment method comprising:
providing, by a processor, information on one or more valid GAs to an electric vehicle (EV) entering within a radio communication radius of the SECC;
performing, by the processor, wireless communication association between the SECC of a target GA selected by the EV among the one or more valid GAs and an electric vehicle communication controller (EVCC);
performing, by the processor, a position alignment approval and authentication procedure between the EV and the target GA according to a request of the EVCC;
performing, by the processor, position alignment between the EV and the target GA using low frequency (LF) signals when authentication is successful;
receiving, by the processor, a data set from the EVCC using LF signals after the position alignment with the target GA; and
performing, by the processor, pairing with the target GA based on the data set;
wherein the data set includes:
- a preamble block including preamble information for identifying an input signal and synchronization information; and
- a data block including first data fixed to zeros, a collision-avoidance code including a temporary identifier of each antenna, dummy data, cyclic redundancy check (CRC) information, and guard information.

16. The position alignment method according to claim 15, wherein performing the pairing comprises:
receiving a pairing request from the EVCC;
receiving the data set including a pairing ID from the EVCC using LF signals;
performing comparison on the pairing ID; and
transmitting a response for the pairing request to the EVCC.

17. The position alignment method according to claim 15, wherein the information on the one or more valid GAs includes at least one of a GA ID for each GA, unique information of an LF system, wireless signal strength information, or combinations thereof.

* * * * *